US012792028B2

(12) United States Patent
Kumar et al.

(10) Patent No.: US 12,792,028 B2
(45) Date of Patent: Nov. 10, 2026

(54) INDUSTRIAL KNOWLEDGE GRAPH AND CONTEXTUALIZATION

(71) Applicant: HONEYWELL INTERNATIONAL INC., Charlotte, NC (US)

(72) Inventors: Manimala Kumar, Charlotte, NC (US); Zameer Gulam Patel, Charlotte, NC (US); Matthew Gregory Taylor Burd, Charlotte, NC (US); Gobinath Pandurangan, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 482 days.

(21) Appl. No.: 18/064,581

(22) Filed: Dec. 12, 2022

(65) Prior Publication Data

US 2023/0195095 A1 Jun. 22, 2023

(30) Foreign Application Priority Data

Dec. 17, 2021 (IN) ............................ 202111059052
Dec. 17, 2021 (IN) ............................ 202111059053
(Continued)

(51) Int. Cl.
*G05B 23/02* (2006.01)
*G06F 16/35* (2025.01)
(Continued)

(52) U.S. Cl.
CPC ....... *G05B 23/0229* (2013.01); *G05B 23/027* (2013.01); *G06F 16/9024* (2019.01);
(Continued)

(58) Field of Classification Search
CPC .............. G05B 23/0229; G05B 23/027; G05B 23/0213; G05B 23/0294; G06F 16/9024;
(Continued)

(56) References Cited

U.S. PATENT DOCUMENTS

2015/0178407 A1 6/2015 Hughes et al.
2016/0246840 A1 8/2016 Masiero et al.
(Continued)

FOREIGN PATENT DOCUMENTS

CN 109074255 A 12/2018
CN 110275898 A 9/2019
(Continued)

OTHER PUBLICATIONS

Schuler et al. ("Accelerating data-driven discovery with scientific asset management," 2016 IEEE 12th International Conference on e-Science (e-Science), Baltimore, MD, USA, 2016, pp. 31-40, doi: 10.1109/eScience.2016.7870883.) (Year: 2016).*
(Continued)

*Primary Examiner* — Christian T Bryant
(74) *Attorney, Agent, or Firm* — Alston & Bird LLP

(57) ABSTRACT

Various embodiments described herein relate to providing and/or employing a knowledge graph related to one or more assets. In this regard, a request to generate knowledge graph data related to one or more assets is received. The request includes an asset descriptor describing the one or more assets. In response to the request, aggregated operational technology data is obtained based on the asset descriptor and from one or more data sources associated with the one or more assets. Furthermore, the aggregated operational technology data is contextualized, based on configuration data for the one or assets and a set of contextualization rules for the one or more data sources, to generate the knowledge graph data. The knowledge graph data is also allocated within a knowledge graph data structure configured for the one or more assets.

20 Claims, 15 Drawing Sheets

(30) Foreign Application Priority Data

Dec. 17, 2021 (IN) ............................ 202111059054
Dec. 17, 2021 (IN) ............................ 202111059109

(51) Int. Cl.

| | |
|---|---|
| ***G06F 16/36*** | (2019.01) |
| ***G06F 16/901*** | (2019.01) |
| ***G06F 40/30*** | (2020.01) |
| ***G06N 5/022*** | (2023.01) |
| ***G06N 5/04*** | (2023.01) |
| ***G06N 20/00*** | (2019.01) |
| ***G06Q 10/063*** | (2023.01) |
| ***G06Q 10/0631*** | (2023.01) |
| ***G06Q 10/0633*** | (2023.01) |
| ***G06Q 10/20*** | (2023.01) |

(52) U.S. Cl.

CPC ......... *G06N 5/022* (2013.01); *G06Q 10/0633* (2013.01); *G06Q 10/20* (2013.01); *G05B 23/0213* (2013.01); *G05B 23/0294* (2013.01); *G06F 16/35* (2019.01); *G06F 16/367* (2019.01); *G06F 40/30* (2020.01); *G06N 5/04* (2013.01); *G06N 20/00* (2019.01); *G06Q 10/063* (2013.01); *G06Q 10/06315* (2013.01)

(58) Field of Classification Search

CPC ........ G06F 16/35; G06F 40/30; G06F 16/367; G06N 5/022; G06N 20/00; G06N 5/04; G06Q 10/0633; G06Q 10/20; G06Q 10/06315; G06Q 10/063

See application file for complete search history.

(56) References Cited

U.S. PATENT DOCUMENTS

| | | | |
|---|---|---|---|
| 2016/0247084 A1 | 8/2016 | Miller et al. | |
| 2016/0349726 A1* | 12/2016 | Srinivasan | G05B 19/048 |
| 2017/0106883 A1 | 4/2017 | Shubs, Jr. et al. | |
| 2017/0278004 A1 | 9/2017 | Mcelhinney et al. | |
| 2017/0371979 A1 | 12/2017 | Murphey et al. | |
| 2018/0137424 A1 | 5/2018 | Gabaldon Royval et al. | |
| 2018/0268291 A1 | 9/2018 | Turner et al. | |
| 2018/0373494 A1 | 12/2018 | Loughrey et al. | |
| 2019/0138662 A1 | 5/2019 | Deutsch et al. | |
| 2019/0258747 A1 | 8/2019 | Milev | |
| 2019/0287006 A1 | 9/2019 | Costabello et al. | |
| 2020/0241990 A1 | 7/2020 | Gustafson et al. | |
| 2021/0080941 A1* | 3/2021 | Entzminger | G05B 19/41855 |
| 2023/0169220 A1* | 6/2023 | Ramanasankaran | G06N 5/022 703/1 |

FOREIGN PATENT DOCUMENTS

| | | |
|---|---|---|
| CN | 110704574 A | 1/2020 |
| CN | 112181972 A | 1/2021 |
| CN | 112596495 A | 4/2021 |
| WO | 2017/191253 A1 | 11/2017 |
| WO | 2020/064309 A1 | 4/2020 |

OTHER PUBLICATIONS

Anonymous, Anonymous: Towards autonomous operations of hydrocarbon processing—Part 2 (8 pages), Oct. 1, 2020.

European search report Mailed on Apr. 12, 2023 for EP Application No. 22213652, 11 page(s).

Extended European Search Report Mailed on Apr. 21, 2023 for EP Application No. 22213032, 12 page(s).

Xian Tao Meng, Siemens Ag et al.,: "Autonomous Edge Control and IIoT System with Knowledge Graph and Data Analysis", Prior Art Publishing GmbH, vol. Jul. 15, 2021, 1-5, www.priorartregister.com.

Non-Final Rejection Mailed on Aug. 29, 2024 for U.S. Appl. No. 18/065,983, 25 page(s).

EP Office Action Mailed on Mar. 12, 2025 for EP Application No. 22213652, 8 page(s).

EP Office Action Mailed on Jan. 23, 2025 for EP Application No. 22213032, 13 page(s).

Final Rejection Mailed on Jan. 28, 2025 for U.S. Appl. No. 18/065,983, 30 page(s).

Advisory Action (PTOL-303) Mailed on May 19, 2025 for U.S. Appl. No. 18/065,983, 3 page(s).

EP Office Action Mailed on Jun. 6, 2025 for EP Application No. 22213032, 5 page(s).

Non-Final Rejection Mailed on Jul. 29, 2025 for U.S. Appl. No. 18/065,983, 32 page(s).

CN Office Action Mailed on Sep. 15, 2025 for CN Application No. 202211635028, 7 page(s).

English Translation of CN Office Action dated Sep. 15, 2025 for CN Application No. 202211635028, 11 page(s).

EP Office Action Mailed on Oct. 28, 2025 for EP Application No. 22213653, 13 page(s).

CN Office Action, including Search Report Mailed on Nov. 3, 2025 for CN Application No. 202211635030, 7 page (s).

Communication about intention to grant a European patent Mailed on Nov. 6, 2025 for EP Application No. 22213032, 6 page(s).

English Translation of CN Office Action dated Nov. 3, 2025 for CN Application No. 202211635030, 8 page(s).

Non-Final Rejection Mailed on Oct. 30, 2025 for U.S. Appl. No. 18/066,005, 37 page(s).

Qasim, Faraz, et al. "Development of Advanced Advisory System for Anomalies (AAA) to Predict and Detect the Abnormal Operation in Fired Heaters for Real Time Process Safety and Optimization." Energies 14.21 (2021): 7183. (Year: 2021).

CN Office Action, including Search Report Mailed on Nov. 29, 2025 for CN Application No. 202211634977, 6 page(s).

Decision to grant a European patent Mailed on Jan. 8, 2026 for EP Application No. 22213032, 4 page(s).

English Translation of CN Office Action dated Nov. 29, 2025 for CN Application No. 202211634977, 7 page(s).

CN Office Action Mailed on Mar. 17, 2026 for CN Application No. 202211635028, 5 page(s).

English Translation of CN Office Action dated Mar. 17, 2026 for CN Application No. 202211635028, 8 page(s).

Advisory Action (PTOL-303) Mailed on Apr. 23, 2026 for U.S. Appl. No. 18/065,983, 3 page(s).

Final Rejection Mailed on Mar. 23, 2026 for U.S. Appl. No. 18/066,005, 58 page(s).

Final Rejection Mailed on Feb. 9, 2026 for U.S. Appl. No. 18/065,983, 38 page(s).

CN Office Action, including Search Report Mailed on May 19, 2026 for CN Application No. 202211635030, 7 page(s).

English Translation of CN Office Action dated May 19, 2026 for CN Application No. 202211635030, 9 page(s).

Advisory Action (PTOL-303) Mailed on Jun. 4, 2026 for U.S. Appl. No. 18/066,005, 3 page(s).

CN Notice of Allowance Mailed on May 28, 2026 for CN Application No. 202211634977, 4 page(s).

English translation of CN Notice of Allowance dated May 28, 2026 for CN Application No. 202211634977, 2 page(s).

* cited by examiner

INDUSTRIAL KNOWLEDGE GRAPH AND CONTEXTUALIZATION

CROSS REFERENCE TO RELATED APPLICATIONS

This application claims the benefit under 35 U.S.C. § 119(a) of India Patent Application No. 202111059054, titled "INDUSTRIAL KNOWLEDGE GRAPH AND CONTEXTUALIZATION," and filed on Dec. 17, 2021, India Patent Application No. 202111059053, titled "ARTIFICIAL INTELLIGENCE SYSTEM FOR INTEGRITY OPERATING WINDOW OPTIMIZATION," and filed on Dec. 17, 2021, India Patent Application No. 202111059052, titled "ENTERPRISE DATA MANAGEMENT DASHBOARD," and filed on Dec. 17, 2021, and India Patent Application No. 202111059109, titled "ENTERPRISE DATA MANAGEMENT," and filed on Dec. 17, 2021, the aforementioned applications are hereby incorporated by reference in their entireties.

TECHNICAL FIELD

The present disclosure relates generally to real-time asset analytics, and more particularly to real-time asset analytics for industrial assets.

BACKGROUND

Traditionally, data analytics and/or digital transformation of data related to assets generally involve human interaction. However, often times a specialized worker (e.g., a manager) is responsible for a large number of assets (e.g., a large number of industrial assets in an industrial plant). Therefore, it is generally difficult to identify and/or fix issues with the assets. For example, in certain scenarios, multiple assets (e.g., 25 assets) within an industrial plant may have an issue. Assets in enterprise environments (e.g., industrial plants, etc.) are also often implemented in connection with multiple systems and/or applications. However, determining interrelationships between data from the multiple systems and/or applications is generally difficult, inefficient, and/or time consuming. Furthermore, a limited amount of time is traditionally spent on modeling of data related to assets to, for example, provide insights related to the data. As such, computing resources related to data analytics and/or digital transformation of data related to assets are traditionally employed in an inefficient manner.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. In one or more embodiments, the one or more programs comprise instructions configured to receive a request to generate knowledge graph data related to one or more assets. In one or more embodiments, the request comprises an asset descriptor describing the one or more assets. In one or more embodiments, in response to the request, the one or more programs comprise instructions configured to obtain, based on the asset descriptor, aggregated operational technology data from one or more data sources associated with the one or more assets. In one or more embodiments, in response to the request, the one or more programs also comprise instructions configured to contextualize, based on configuration data for the one or assets and a set of contextualization rules for the one or more data sources, the aggregated operational technology data to generate the knowledge graph data. In one or more embodiments, in response to the request, the one or more programs also comprise instructions configured to allocate the knowledge graph data within a knowledge graph data structure configured for the one or more assets. In one or more embodiments, the one or more programs comprise instructions configured to perform one or more actions with respect to the one or more assets based on the knowledge graph data structure.

In another embodiment, a method comprises, at a device with one or more processors and a memory, receiving a request to generate knowledge graph data related to one or more assets. In one or more embodiments, the request comprises an asset descriptor describing the one or more assets. In one or more embodiments, in response to the request, the method comprises obtaining, based on the asset descriptor, aggregated operational technology data from one or more data sources associated with the one or more assets. In one or more embodiments, in response to the request, the method also comprises contextualizing, based on configuration data for the one or assets and a set of contextualization rules for the one or more data sources, the aggregated operational technology data to generate the knowledge graph data. In one or more embodiments, in response to the request, the method also comprises allocating the knowledge graph data within a knowledge graph data structure configured for the one or more assets. In one or more embodiments, the method also comprises performing one or more actions with respect to the one or more assets based on the knowledge graph data structure.

In yet another embodiment, a non-transitory computer-readable storage medium comprises one or more programs for execution by one or more processors of a device. The one or more programs comprise instructions which, when executed by the one or more processors, cause the device to receive a request to generate knowledge graph data related to one or more assets. In one or more embodiments, the request comprises an asset descriptor describing the one or more assets. In one or more embodiments, the one or more programs comprise instructions which, when executed by the one or more processors and in response to the request, cause the device to obtain, based on the asset descriptor, aggregated operational technology data from one or more data sources associated with the one or more assets. In one or more embodiments, the one or more programs also comprise instructions which, when executed by the one or more processors and in response to the request, cause the device to contextualize, based on configuration data for the one or assets and a set of contextualization rules for the one or more data sources, the aggregated operational technology data to generate the knowledge graph data. In one or more embodiments, the one or more programs also comprise instructions which, when executed by the one or more processors and in response to the request, cause the device to allocate the knowledge graph data within a knowledge graph data structure configured for the one or more assets. In one or more embodiments, the one or more programs also comprise instructions which, when executed by the one or more processors, cause the device to perform one or more actions with respect to the one or more assets based on the knowledge graph data structure.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
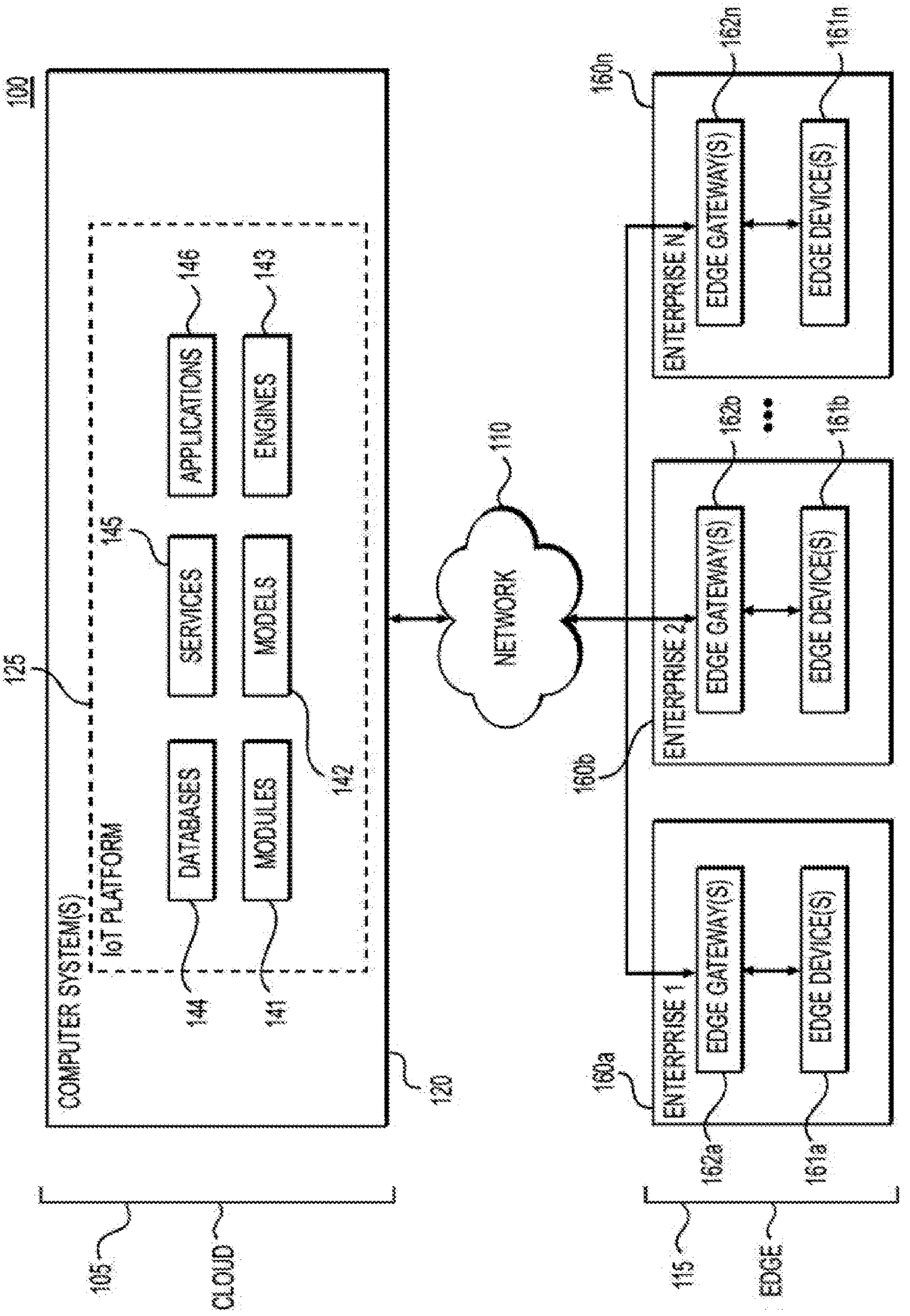
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Traditionally, data analytics and/or digital transformation of data related to assets generally involves human interaction. However, often times a specialized worker (e.g., a manager) is responsible for a large number of assets (e.g., a large number of industrial assets in an industrial plant). Therefore, it is generally difficult to identify and/or fix issues with the assets. For example, in certain scenarios, multiple assets (e.g., 25 assets) within an industrial plant may have an issue. Assets in enterprise environments (e.g., industrial plants, etc.) are also often implemented in connection with multiple systems and/or applications. However, determining inter-relationships between data from the multiple systems and/or applications is generally difficult, inefficient, and/or time consuming. Furthermore, a limited amount of time is traditionally spent on modeling of data related to assets to, for example, provide insights related to the data. As such, computing resources related to data analytics and/or digital transformation of data related to assets are traditionally employed in an inefficient manner.

Thus, to address these and/or other issues, technologies and/or techniques disclosed herein are employed to provide enterprise data management related to one or more assets. In various embodiments, a knowledge graph related to one or more assets is provided. Additionally or alternatively, in various embodiments, the technologies and/or techniques disclosed herein are employed to provide contextualization of data for a knowledge graph related to one or more assets. In one or more embodiments, the knowledge graph is an industrial knowledge graph related to one or more industrial assets. In one or more embodiments, an artificial intelligence system for integrity operating window optimization for one or more assets is provided. In various embodiments, the artificial intelligence system is a cognitive advisor for enterprise data management. In one or more embodiments, the artificial intelligence system employs a knowledge graph related to the one or more assets. In one or more embodiments, the knowledge graph is an industrial knowledge graph related to one or more industrial assets. In one or more embodiments, an enterprise data management dashboard is provided.

In one or more embodiments, the knowledge graph is constructed based on individual relationships configured for the one or more assets and/or in one or more systems related to the one or more assets. As such, in various embodiments, the knowledge graph derives one or more relationships that are not directly available in source systems configuration datasets for the one or more assets. In one or more embodiments, the knowledge graph is constructed using a configuration of rules for one or more data sources associated with the one or more assets. In one or more embodiments, the knowledge graph captures unified data and relationships for an industrial plant. Accordingly, in one or more embodiments, a pre-indexed industrial search is performed with respect to the knowledge graph to provide one or more insights with respect to the one or more assets. In one or more embodiments, the knowledge graph is constructed based on input specific to a source system type and/or a file format for data associated with the one or more assets. For example, in one or more embodiments, configuration information for one or more systems of an industrial plant that includes the one or more assets is employed to construct the knowledge graph and/or to contextualize data for the knowledge graph. In one or more embodiments, the knowledge graph provides a consolidated mapping of operational technology data associated with monitoring and/or control of the one or more assets.

In one or more embodiments, the knowledge graph is employed to adjust one or more integrity operating windows (e.g., one or more operational boundaries) for one or more processes related to the one or more assets. For example, in one or more embodiments, one or more operating condition insights with respect to the knowledge graph are employed to apply dynamic limits (e.g., adaptive thresholding) for one or more processes related to the one or more assets. In one or more embodiments, a cognitive advisor dynamically optimizes one or more integrity operating windows) for one or more processes related to the one or more assets. Additionally, in one or more embodiments, the cognitive advisor provides one or more notifications associated with an early warning before actual operations for the one or more processes deviate from a set operating limit. In one or more embodiments, the cognitive advisor provides a prediction for future industrial plant state and/or a prediction for a root causes of the future industrial plant state. Additionally, in one or more embodiments, the cognitive advisor provides one or more recommendations regarding how to fix a corresponding issue for an asset and/or process with a certain degree of confidence. As such, in various embodiments, the cognitive advisor provides a prediction of a certain industrial plant state by employing the knowledge graph to identify one or more events occurring with respect to the one or more processes. In various embodiments, the knowledge graph models relationships between end points (e.g., to provide an influence/dependency flow view of the one or more processes related to the one or more assets). In various embodiments, the cognitive advisor determines whether implied relationships associated with the knowledge graph are correlated (e.g., using historical data) and/or adds ontological relationship data to the knowledge graph in response to determining that the correlation is above a threshold value. As such, in various embodiments, the cognitive advisor identifies end points in the knowledge graph with a certain degree of significance for an asset to, for example, improve performance of the asset and/or a process performed by the asset.

In one or more embodiments, a visualization interface (e.g., dashboard visualization) presents information associated with the knowledge graph and/or the one or more insights associated with the one or more assets. In one or more embodiments, the visualization interface is configured to allow an end user at an industrial plant (e.g., an application engineer, a remote support engineer, another end user, etc.) to navigate the visualization interface, access information associated with the knowledge graph, access information associated with the one or more insights, and/or troubleshoot issues associated with the one or more assets without expertise knowledge of existing systems and/or tags associated with the one or more assets. In one or more embodiments, a scheduled analytics engine employs the knowledge graph to process one or more limits, one or more deviations, one or more targets, and/or other data associated with the one or more assets and/or one or more processes related to the one or more assets. In one or more embodiments, one or more recommendations are automatically generated based on the one or more insights associated with the knowledge graph to correct one or more limits, one or more thresholds, one or more tolerances, and/or other settings for the one or more assets.

In various embodiments, operational technology data associated with one or more assets is ingested, cleaned and aggregated to provide aggregated operational technology data. Furthermore, in various embodiments, one or more metrics are determined from the aggregated operational technology data to provide opportunity and/or performance insights for the assets. According to various embodiments, a dashboard visualization that presents issues associated with the one or more assets is provided. In various embodiments, the dashboard visualization is an enterprise application that allows a portfolio operator to remotely manage, investigate, and/or resolve issues associated with the one or more assets. In various embodiments, features, attributes and/or relationships associated with the aggregated operational technology data are determined based on the knowledge graph to, for example, trouble-shoot equipment faults, control equipment, and/or change set-points to resolve issues within the dashboard visualization. In various embodiments, the dashboard visualization facilitates aggregation of operational technology data into a score or metric value such as, for example, a key performance indicator (KPI). In various embodiments, the dashboard visualization additionally or alternatively facilitates providing recommendations to improve asset performance. In various embodiments, the dashboard visualization additionally or alternatively facilitates remote control and/or altering of asset set points. In one or more embodiments, the issues associated with the one or more assets are ordered such that issues with a largest impact with respect to the portfolio of assets is presented first via the dashboard visualization. Impact may be based on cost to repair an asset, energy consumption associated with issues related to the one or more assets, savings lost associated with issues related to the one or more assets, etc.

In various embodiments, a user may employ the dashboard visualization to identify issues associated with the one or more assets, to make adjustments with respect to the one or more assets, and/or to make work orders associated with the one or more assets. In various embodiments, a user may be subscribed to a performance management category (e.g., Energy Optimization, Digitized Maintenance, etc.) to facilitate determining issues for the one or more assets to be resolved and/or to facilitate determining an ordering for prioritized actions related to the one or more assets. For example, an ordering of prioritized actions may be different for Energy Optimization than Digitized Maintenance. In various embodiments, the dashboard visualization provides an alerts list that combines alerts from an on-premise building management system (BMS). In various embodiments, cloud analytics is performed to group alerts based on issues and/or to prioritize the issues based on one or more algorithms. As such, according to various embodiments, asset and/or workforce use is optimized, and highest priority issues related to the one or more assets is presented to a user in an optimal manner. Additionally, according to various embodiments, facility operating and/or maintenance costs are reduced while also improving equipment up-time, service operational efficiency, and/or environmental conditions by employing the dashboard visualization. Additionally, by employing the dashboard visualization according to various embodiments, remote triage of faults and/or remote resolution of asset issues is provided. In various embodiments, the dashboard visualization provides real-time asset analytics associated with sensors (e.g., vibration, power, etc.), control devices (e.g., key performance indicators (KPIs), equipment states, etc.), labor management (e.g., allocation, utilization, quality, etc.), warehouse execution (e.g., orders, routing, etc.), inventory management (e.g., location, quantity, slotting, etc.), and/or one or more other layers of an enterprise. Additionally, according to various embodiments, the dashboard visualization provides centralized capability to review, manage and/or control assets.

In various embodiments, the knowledge graph is employed to provide automated display of real-time properties and trends related to service cases into tabular and graphical displays. Additionally or alternatively, in various embodiments, an knowledge graph is employed to provide automated generation and display of equipment schematic diagrams and configurations using standard or modular diagrams populated by model data. Additionally or alternatively, in various embodiments, the knowledge graph is employed to create a graph model view of relationships between the one or more assets (e.g., between equipment and/or other assets in the facilities, between building and physical spaces within buildings, etc.). Additionally or alternatively, in various embodiments, the knowledge graph is employed to determine relationships between models such that nodes in the graph visually indicates whether the portfolio of assets is associated with one or more alarms related to the nodes. Additionally or alternatively, in various embodiments, the knowledge graph is employed to provide information notifications via the nodes with asset data and/or links to other information.

In various embodiments, the dashboard visualization facilitates display of graphics and/or other visualizations related to the one or more assets. For example, in various embodiments, the dashboard visualization provides dynamically generated graphics that show configuration of, relationships between, and/or location of assets to, for example, enable knowledge associated with remote facilities, aiding of fault diagnosis, and/or performing actions related to issues. In various embodiments, the dashboard visualization facilitates operations and/or scheduling associated with the one or more assets. For example, in various embodiments, the dashboard visualization facilitate temporary or long-term changes to operational modes of assets can be made through scheduling changes and/or manual switching to allow for events, seasonal changes, maintenance periods and/or other changes to asset use or operations.

In various embodiments, the dashboard visualization presents alerts from different sources and/or different system types into a single alert screen to provide a prioritized view of issues related to the one or more assets. According to various embodiments, the alerts include alarms from on-premises BMS, security, fire and other systems. Additionally or alternatively, according to various embodiments, the alerts include alerts from analytics and/or rule-based cloud-located systems with respect to current states and/or historical states of assets. Additionally or alternatively, according to various embodiments, the alerts include alerts from systems monitoring an asset environment and/or health and safety conditions associated with the one or more assets. Additionally or alternatively, according to various embodiments, the alerts include alerts from cyber security systems. Additionally or alternatively, according to various embodiments, the alerts include alerts from systems monitoring of the health of the one or more assets. In various embodiments, the alerts are logically grouped and/or presented to an operator via the dashboard visualization. In various embodiments, the alerts are logically grouped based on location (e.g., geographic areas or buildings) and/or related assets. In various embodiments, the alerts are presented via the dashboard visualization such that the highest priority issues are at the top of the list of alerts. In various embodiments, prioritization of the alerts is determined based on type of asset, type of facility, use and size of area affected by the issues, number of assets, number of issues, types assigned priority of individual alerts, and/or other features associated with the assets. In various embodiments, machine learning is employed to logically grouped and/or present the alerts. In various embodiments, machine learning is employed to identify alerts that optimally reflect use by an operator of the dashboard visualization.

In various embodiments, a dashboard visualization across various user identities is provided via a templated dashboard model using the knowledge graph. In various embodiments, a dashboard visualization for a particular user identity (e.g., a maintenance is reported at various hierarchy levels such as an enterprise level, a site level, a plant level, a unit level (e.g., an asset level), etc. In various embodiments, metrics associated with a first asset hierarchy level (e.g., an enterprise level) includes metrics or goals (e.g., OEE, etc.). In various embodiments, metrics associated with a second asset hierarchy level (e.g., a site level) includes metrics that influence a target goal (e.g., availability, energy, performance, quality). In various embodiments, metrics associated with a third asset hierarchy level (e.g., a plant level) includes identification of undesirable actor assets that influences targeted goal OEE. In various embodiments, metrics associated with a fourth asset hierarchy level (e.g., an asset level) includes events or exception that are related to a target goal.

In various embodiments, a dashboard visualization is modified based on context (e.g., a dashboard is changed to energy context and displays a same level of details based on modelling of assets and/or metrics via the knowledge graph). In various embodiments, the knowledge graph is employed to present relevant metrics based on user role, user context of invoking the dashboard, and/or hierarchy mapped for a metrics model. In various embodiments, an application programming interface is employed to integrate different visualization tools and/or different reporting tools (e.g., via the dashboard visualization). In one or more embodiments, a user-interactive graphical user interface is generated. For instance, in one or more embodiments, the graphical user interface renders a visual representation of the dashboard visualization. In one or more embodiments, one or more notifications for user devices are generated based on metrics associated with the knowledge graph.

As such, by employing one or more techniques disclosed herein, enterprise data management and/or asset performance is optimized. Moreover, by employing a knowledge graph and/or one or more techniques disclosed herein, improved insights for opportunity and/or performance insights for assets is provided to a user. For instance, by employing a knowledge graph and/or one or more techniques disclosed herein, additional and/or improved asset insights as compared to capabilities of conventional techniques can be achieved across a data set. Additionally, performance of a processing system associated with data analytics is improved by employing one or more techniques disclosed herein. For example, a number of computing resources, a number of a storage requirements, and/or number of errors associated with data analytics is reduced by employing one or more techniques disclosed herein. In addition, by employing a knowledge graph and/or one or more techniques disclosed herein, cost savings for one or assets and/or one or more asset enterprises is provided.

FIG. 1 illustrates an exemplary networked computing system environment 100, according to the present disclosure. As shown in FIG. 1, networked computing system environment 100 is organized into a plurality of layers including a cloud 105 (e.g., cloud layer 105), a network 110 (e.g., network layer 110), and an edge 115 (e.g., edge layer 115). As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160*a*-160*n* each including one or more edge devices 161*a*-161*n* and one or more edge gateways 162*a*-162*n*. For example, a first enterprise 160*a* includes first edge devices 161*a* and first edge gateways 162*a*, a second enterprise 160*b* includes second edge devices 161*b* and second edge gateways 162*b*, and an nth enterprise 160*n* includes nth edge devices 161*n* and nth edge gateways 162*n*. As used herein, enterprises 160*a*-160*n* represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
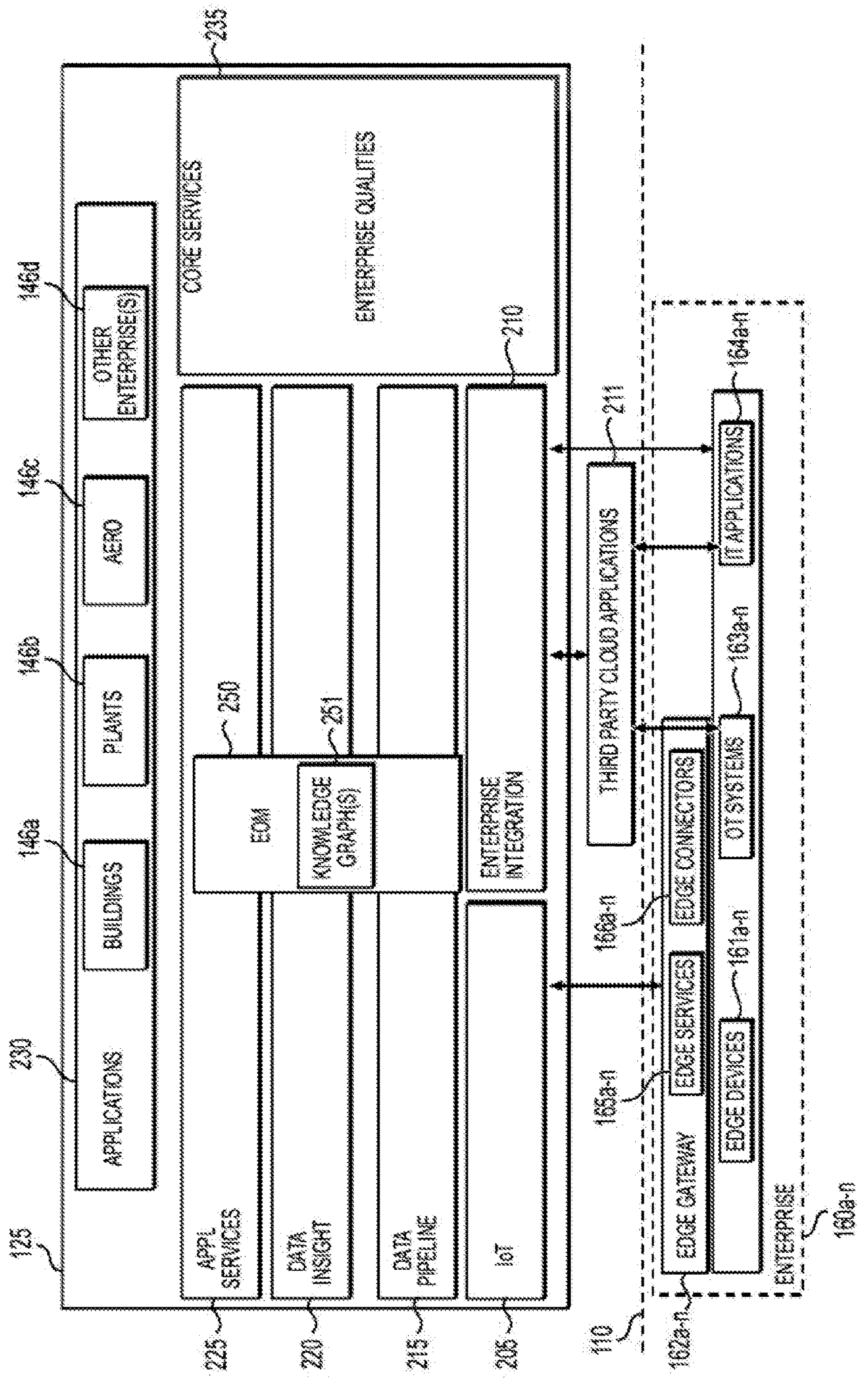
FIG. 2 illustrates a schematic block diagram of a framework of an IoT platform of the networked computing system, in accordance with one or more embodiments described herein.

According to various embodiments, the edge devices 161*a*-161*n* represent any of a variety of different types of devices that may be found within the enterprises 160*a*-160*n*. Edge devices 161*a*-161*n* are any type of device configured to access network 110, or be accessed by other devices through network 110, such as via an edge gateway 162*a*-162*n*. According to various embodiments, edge devices 161*a*-161*n* are "IoT devices" which include any type of network-connected (e.g., Internet-connected) device. For example, in one or more embodiments, the edge devices 161*a*-161*n* include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161*a*-161*n* includes, or is otherwise in communication with, one or more controllers for selectively controlling a respective edge device 161*a*-161*n* and/or for sending/receiving information between the edge devices 161*a*-161*n* and the cloud 105 via network 110. With reference to FIG. 2, in one or more embodiments, the edge 115 include operational technology (OT) systems 163*a*-163*n* and information technology (IT) applications 164*a*-164*n* of each enterprise 161*a*-161*n*. The OT systems 163*a*-163*n* include hardware and software for detecting and/or causing a change, through the direct monitoring and/or control of industrial equipment (e.g., edge devices 161*a*-161*n*), assets, processes, and/or events. The IT applications 164*a*-164*n* includes network, storage, and computing resources for the generation, management, storage, and delivery of data throughout and between organizations.

The edge gateways 162*a*-162*n* include devices for facilitating communication between the edge devices 161*a*-161*n* and the cloud 105 via network 110. For example, the edge gateways 162*a*-162*n* include one or more communication interfaces for communicating with the edge devices 161*a*-161*n* and for communicating with the cloud 105 via network 110. According to various embodiments, the communication interfaces of the edge gateways 162*a*-162*n* include one or more cellular radios, Bluetooth, WiFi, near-field communication radios, Ethernet, or other appropriate communication devices for transmitting and receiving information. According to various embodiments, multiple communication interfaces are included in each gateway 162*a*-162*n* for providing multiple forms of communication between the edge devices 161*a*-161*n*, the gateways 162*a*-162*n*, and the cloud 105 via network 110. For example, in one or more embodiments, communication are achieved with the edge devices 161*a*-161*n* and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162*a*-162*n* also include a processor and memory for storing and executing program instructions to facilitate data processing. For example, in one or more embodiments, the edge gateways 162*a*-162*n* are configured to receive data from the edge devices 161*a*-161*n* and process the data prior to sending the data to the cloud 105. Accordingly, in one or more embodiments, the edge gateways 162*a*-162*n* include one or more software modules or components for providing data processing services and/or other services or methods of the present disclosure. With reference to FIG. 2, each edge gateway 162*a*-162*n* includes edge services 165*a*-165*n* and edge connectors 166*a*-166*n*. According to various embodiments, the edge services 165*a*-165*n* include hardware and software components for processing the data from the edge devices 161*a*-161*n*. According to various embodiments, the edge connectors 166*a*-166*n* include hardware and software components for facilitating communication between the edge gateway 162*a*-162*n* and the cloud 105 via network 110, as detailed above. In some cases, any of edge devices 161*a-n*, edge connectors 166*a-n*, and edge gateways 162*a-n* have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160*a*-160*n*. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160*a*-160*n* using an extensible graph based object model (or "asset model"). In one or more embodiments, the extensible object model 250 is associated with knowledge graphs 251 where the equipment (e.g., edge devices 161*a*-161*n*) and processes of the enterprise 160*a*-160*n* are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161*a* -161*n*) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161*a*-161*n*), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161*a*-161*n* of an enterprise 160*a*-160*n*, and the knowledge graphs 251 are input into the EOM 250 for visualizing the models (e.g., the nodes and links).

The models describe the assets (e.g., the nodes) of an enterprise (e.g., the edge devices 161*a*-161*n*) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161*a*-161*n*) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a*-161*n* and the applications 146 that handle those devices 161*a*-161*n*. For example, when new edge devices 161*a*-161*n* are added to an enterprise 160*a*-160*n* system, the new devices 161*a*-161*n* will automatically appear in the IoT platform 125 so that the corresponding applications 146 understand and use the data from the new devices 161*a*-161*n*.

In some cases, asset templates are used to facilitate configuration of instances of edge devices 161*a*-161*n* in the model using common structures. An asset template defines the typical properties for the edge devices 161*a*-161*n* of a given enterprise 160*a*-160*n* for a certain type of device. For example, an asset template of a pump includes modeling the pump having inlet and outlet pressures, speed, flow, etc. The templates may also include hierarchical or derived types of edge devices 161*a*-161*n* to accommodate variations of a base type of device 161*a*-161*n*. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161*a*-161*n* and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, in one or more embodiments, data is ingested from the edge devices 161*a*-161*n* through process historians or laboratory information management systems. The IoT layer 205 is in communication with the edge connectors 166*a*-166*n* installed on the edge gateways 162*a*-162*n* through network 110, and the edge connectors 166*a*-166*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. According to various embodiments, data is sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a*-163*n* and IT applications 164*a*-164*n* of the enterprise 160*a*-160*n*. Thus, the enterprise integration layer 210 enables the IoT platform 125 to receive data from the third-party applications 211 rather than, or in combination with, receiving the data from the edge devices 161*a*-161*n* directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161*a*-161*n*). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161*a*-161*n*) instance is created, any associated calculation instances are also created with their input and output parameters linked to the appropriate attributes of the asset (e.g., edge device 161*a*-161*n*).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160*a*-160*n* performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160*a*-160*n* looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been preprogrammed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161*a*-161*n*.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146*a-d*. The applications layer 230 includes one or more applications 146*a-d* of the IoT platform 125. For example, according to various embodiments, the applications 146*a-d* includes a buildings application 146*a*, a plants application 146*b*, an aero application 146*c*, and other enterprise applications 146*d*. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160*a*-160*n* (e.g., buildings application 146*a*, plants application 146*b*, aero application 146*c*, and other enterprise applications 146*d*).

The applications layer 230 also enables visualization of performance of the enterprise 160*a*-160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
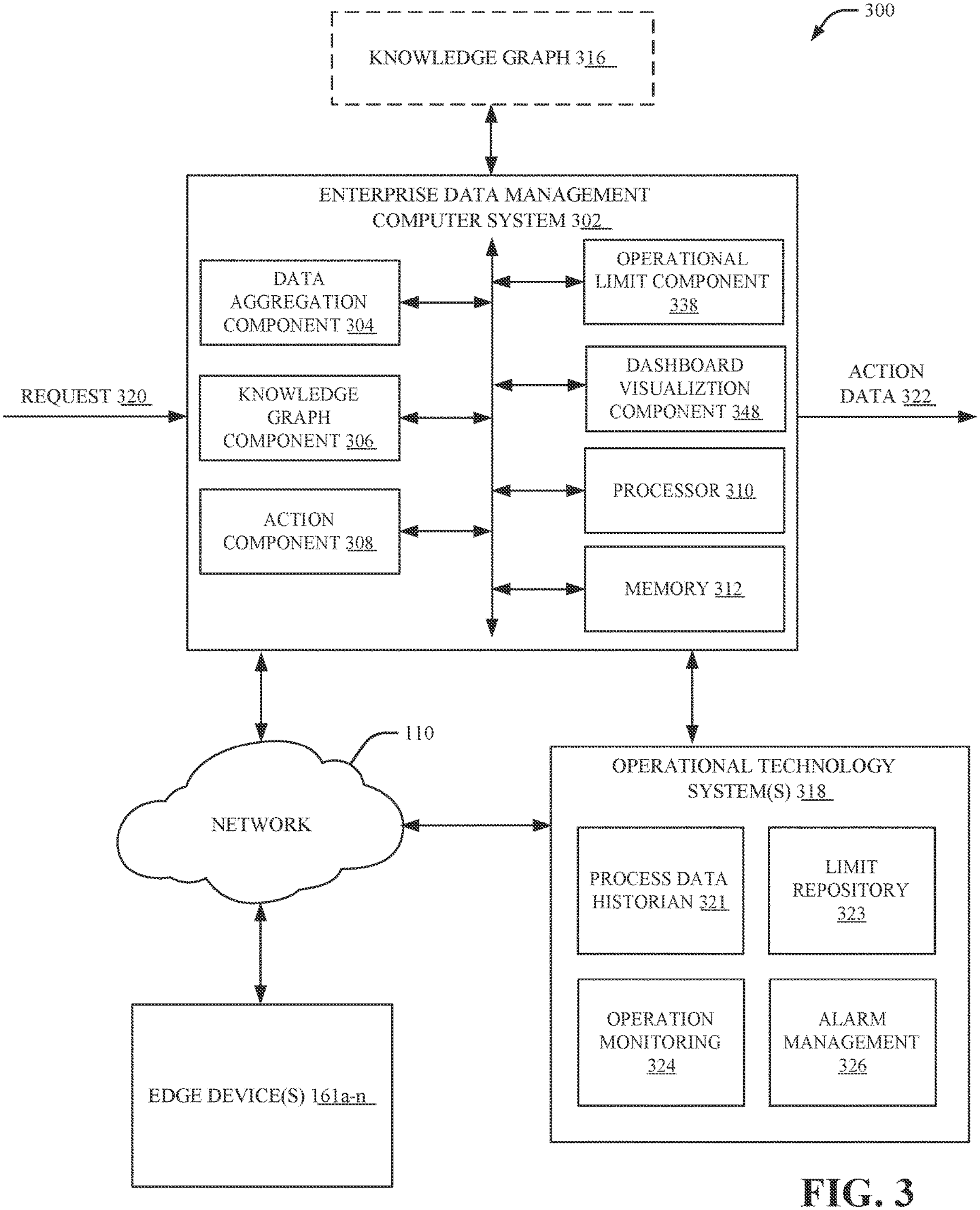
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an enterprise data management computer system 302 to facilitate a practical application of data analytics technology and/or digital transformation technology to provide optimization related to enterprise data management. In one or more embodiments, the enterprise data management computer system 302 facilitates a practical application of knowledge graph generation and/or contextualization of data for a knowledge graph to provide optimization related to enterprise data management. In one or more embodiments, the enterprise data management computer system 302 stores and/or analyzes data that is aggregated from one or more assets and/or one or more data sources associated with an enterprise system (e.g., a building system, an industrial system or another type of enterprise system). In one or more embodiments, the enterprise data management computer system 302 employs artificial intelligence to provide a knowledge graph and/or contextualization of data for a knowledge graph. In one or more embodiments, the enterprise data management computer system 302 generates a dashboard visualization (e.g., an enterprise data management dashboard) based on the knowledge graph and/or one or more insights obtained based on the knowledge graph.

In an embodiment, the enterprise data management computer system 302 is a server system (e.g., a server device) that facilitates a data analytics platform between one or more computing devices, one or more data sources, and/or one or more assets. In one or more embodiments, the enterprise data management computer system 302 is a device with one or more processors and a memory. In one or more embodiments, the enterprise data management computer system 302 is a computer system from the computer systems 120. For example, in one or more embodiments, the enterprise data management computer system 302 is implemented via the cloud 105. The enterprise data management computer system 302 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the enterprise data management computer system 302 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the enterprise data management computer system 302 improves performance of a computing device. For example, in one or more embodiments, the enterprise data management computer system 302 improves processing efficiency of a computing device (e.g., a server), reduces power consumption of a computing device (e.g., a server), improves quality of data provided by a computing device (e.g., a server), etc.

The enterprise data management computer system 302 includes a data aggregation component 304, a knowledge graph component 306, an action component 308, an operational limit component 338, and/or a dashboard visualization component 348. Additionally, in one or more embodiments, the enterprise data management computer system 302 includes a processor 310 and/or a memory 312. In certain embodiments, one or more aspects of the enterprise data management computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the enterprise data management computer system 302, a remote processor (e.g., a processor implemented on a server), and/or a virtual machine. In certain embodiments, the processor 310 is in communication with the memory 312, the data aggregation component 304, the knowledge graph component 306, the action component 308, the operational limit component 338, and/or the dashboard visualization component 348 via a bus to, for example, facilitate transmission of data among the processor 310, the memory 312, the data aggregation component 304, the knowledge graph component 306, the action component 308, the operational limit component 338, and/or the dashboard visualization component 348. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the enterprise data management computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the enterprise data management computer system 302 (e.g., the data aggregation component 304 of the enterprise data management computer system 302) receives asset data from the edge devices 161*a*-161*n*. In one or more embodiments, the edge devices 161*a*-161*n* are associated with a portfolio of assets. For instance, in one or more embodiments, the edge devices 161*a*-161*n* include one or more assets in a portfolio of assets. The edge devices 161*a*-161*n* include, in one or more embodiments, one or more databases, one or more assets (e.g., one or more building assets, one or more industrial assets, etc.), one or more IoT devices (e.g., one or more industrial IoT devices), one or more industrial assets, one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, and/or one or more other devices that are connected to the network 110 for collecting, sending, and/or receiving information. In one or more embodiments, the edge device 161*a*-161*n* include, or is otherwise in communication with, one or more controllers for selectively controlling a respective edge device 161*a*-161*n* and/or for sending/receiving information between the edge devices 161*a*-161*n* and the enterprise data management computer system 302 via the network 110. The asset data includes, for example, industrial data, process data, operational technology data, alarm limits, planning limits, quality limits, environment limits, connected building data, sensor data, real-time data, historical data, event data, location data, and/or other data associated with the edge devices 161*a*-161*n*.

In certain embodiments, at least one edge device from the edge devices 161*a*-161*n* incorporates encryption capabilities to facilitate encryption of one or more portions of the asset data 314. Additionally, in one or more embodiments, the enterprise data management computer system 302 (e.g., the data aggregation component 304 of the enterprise data management computer system 302) receives the asset data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161*a*-161*n* are associated with an industrial environment (e.g., a plant, etc.). Additionally or alternatively, in one or more embodiments, the edge devices 161*a*-161*n* are associated with components of the edge 115 such as, for example, one or more enterprises 160*a*-160*n*.

In one or more embodiments, the data aggregation component 304 aggregates the asset data from the edge devices 161*a*-161*n*. For instance, in one or more embodiments, the data aggregation component 304 aggregates the asset data into one or more databases and/or one or more data repositories. In one or more embodiments, the data aggregation component 304 is in communication with and/or controls one or more portions of one or more operational technology systems 318. The one or more operational technology systems 318 include, for example, process data historian 321, limit repository 323, operation monitoring 324, and/or alarm management 326 related to the edge devices 161*a*-161*n*. The process data historian 321 is a system that collects and/or stores time-series data related to the edge devices 161*a*-161*n*. For example, in one or more embodiments, the process data historian 321 stores process data related to one or more processes executed by the edge devices 161*a*-161*n*. The limit repository 323 is a system that manages and/or stores limit values (e.g., threshold values) for alarms, planning, quality, and/or environment criteria associated with the edge devices 161*a*-161*n*. The limit values are, for example, boundaries, constraints, and/or operating limits associated with process control of the edge devices 161*a*-161*n*. In one or more embodiments, the limit repository 323 monitors and/or maintains consistency among various processes performed by the edge devices 161*a*-161*n*. The operation monitoring 324 monitors one or more processes performed by the edge devices 161*a*-161*n*. In one or more embodiments, the operation monitoring 324 employs performance metrics to monitor performance of one or more processes performed by the edge devices 161*a*-161*n*. In one or more embodiments, the operation monitoring 324 repeatedly monitors one or more processes performed by the edge devices 161*a*-161*n* based on predetermined intervals of time. In one or more embodiments, the operation monitoring 324 measures and/or calculates process data and compares the process data against one or more performance metrics for the process data. The alarm management 326 manages one or more alarms related to one or more processes performed by the edge devices 161*a*-161*n*. In one or more embodiments, the alarm management 326 optimizes one or more alarms related to one or more processes performed by the edge devices 161*a*-161*n*. In one or more embodiments, the alarm management 326 manages thresholds and/or other criteria for respective alarms related to one or more processes performed by the edge devices 161*a*-161*n*. In one or more embodiments, the alarm management 326 manages the alarms based on performance metrics associated with the one or more processes performed by the edge devices 161*a*-161*n*.

In one or more embodiments, the data aggregation component 304 repeatedly updates data for the one or more operational technology systems 318 based on data provided by the edge devices 161*a*-161*n*. For instance, in one or more embodiments, the data aggregation component 304 stores new data and/or modified data associated with the edge devices 161*a*-161*n*. In one or more embodiments, the data aggregation component 304 repeatedly scans the edge devices 161*a*-161*n* to determine new data for storage. In one or more embodiments, the data aggregation component 304 formats one or more portions of data associated with the edge devices 161*a*-161*n*. For instance, in one or more embodiments, the data aggregation component 304 provides a formatted version of data associated with the edge devices 161*a*-161*n* to the one or more operational technology systems 318. In an embodiment, the formatted version of the data associated with the edge devices 161*a*-161*n* is formatted with one or more defined formats associated with the process data historian 321, the limit repository 323, the operation monitoring 324, and/or the alarm management 326. A defined format is, for example, a structure for data fields and/or data files associated with the process data historian 321, the limit repository 323, the operation monitoring 324, and/or the alarm management 326.

In one or more embodiments, the data aggregation component 304 identifies and/or groups data types for data associated with the edge devices 161*a*-161*n*. In one or more embodiments, the data aggregation component 304 employs batching, concatenation of data, identification of data types, merging of data, grouping of data, reading of data and/or writing of data associated with the edge devices 161*a*-161*n* to facilitate storage of data for the process data historian 321, the limit repository 323, the operation monitoring 324, and/or the alarm management 326. In one or more embodiments, the data aggregation component 304 groups data associated with the edge devices 161*a*-161*n* based on corresponding features and/or attributes of the data. In one or more embodiments, the data aggregation component 304 groups data associated with the edge devices 161*a*-161*n* based on corresponding identifiers (e.g., a matching asset hierarchy level, a matching asset, a matching connected building, etc.) for the data. In one or more embodiments, the data aggregation component 304 employs one or more locality-sensitive hashing techniques to group data associated with the edge devices 161*a*-161*n* based on similarity scores and/or calculated distances between different data.

The knowledge graph component 306 manages a knowledge graph 316 related to the one or more assets. The knowledge graph 316 is a knowledge graph data structure configured for the one or more assets. For example, in one or more embodiments, the knowledge graph 316 is a semantic network graph that represents a network of data and/or interconnected relationships associated with the edge devices 161*a*-161*n* and/or one or more systems related to the edge devices 161*a*-161*n*. In one or more embodiments, the knowledge graph 316 corresponds to the knowledge graph 251. In an embodiment, the knowledge graph 316 is an industrial knowledge graph related to one or more industrial assets. In one or more embodiments, the knowledge graph is configured as an extensible object model associated with the edge devices 161*a*-161*n* and/or one or more systems related to the edge devices 161*a*-161*n*. In one or more embodiments, the knowledge graph 316 includes a set of nodes and/or a set of connectors that graphically represents data associated with the process data historian 321, the limit repository 323, the operation monitoring 324, and/or the alarm management 326. Furthermore, in one or more embodiments, the knowledge graph 316 graphically represents relationships between the data associated with the process data historian 321, the limit repository 323, the operation monitoring 324, and/or the alarm management 326. In certain embodiments, the knowledge graph 316 graphically represents patterns and/or trends between the data associated with the process data historian 321, the limit repository 323, the operation monitoring 324, and/or the alarm management 326. In one or more embodiments, the knowledge graph component 306 contextualizes the data associated with the process data historian 321, the limit repository 323, the operation monitoring 324, and/or the alarm management 326 based on attributes for the data associated with the process data historian 321, the limit repository 323, the operation monitoring 324, and/or the alarm management 326. Additionally or alternatively, in one or more embodiments, the knowledge graph component 306 allocates the data within the knowledge graph 316 based on the attributes for the data.

In one or more embodiments, the enterprise data management computer system 302 (e.g., the knowledge graph component 306 of the enterprise data management computer system 302) receives a request 320. In an embodiment, the request 320 is a request to generate knowledge graph data related to one or more assets. For instance, in one or more embodiments, the request 320 is a request to generate knowledge graph data related to the edge devices 161*a*-161*n*. In one or more embodiments, the request 320 is a request to generate knowledge graph data for the knowledge graph 316. In another embodiment, the request 320 is a request to obtain one or more insights related to one or more assets. For instance, in one or more embodiments, the request 320 is a request to obtain one or more insights related to the edge devices 161*a*-161*n*. In one or more embodiments, the request 320 is a request to obtain one or more insights with respect to the knowledge graph 316. In another embodiment, the request 320 is a request to generate a dashboard visualization related to one or more assets. For instance, in one or more embodiments, the request 320 is a request to generate a dashboard visualization related to the edge devices 161*a*-161*n*. In one or more embodiments, the request 320 is a request to generate a dashboard visualization related to the knowledge graph 316.

In one or more embodiments, the request 320 includes one or more asset descriptors that describe the one or more assets. For instance, in one or more embodiments, the request 320 includes one or more asset descriptors that describe the edge devices 161*a*-161*n*. An asset descriptor includes, for example, an asset name, an asset identifier, an asset level and/or other information associated with an asset. Additionally or alternatively, in one or more embodiments, the request 320 includes one or more user identifiers describing a user role for a user associated with the request 320 and/or access of a dashboard visualization. A user identifier includes, for example, an identifier for a user role name (e.g., a manager, an executive, a maintenance engineer, a process engineer, etc.). Additionally or alternatively, in one or more embodiments, the request 320 includes one or more metrics context identifiers describing context for the knowledge graph 316. A metrics context identifier includes, for example, an identifier for a plant performance metric, an asset performance metric, a goal (e.g., review production related to one or more assets, etc.). Additionally or alternatively, in one or more embodiments, the request 320 includes one or more time interval identifier describing an interval of time for one or more insights related to the one or more assets. In one or more embodiments, a time interval identifier is a reporting time identifier describing an interval of time for one or more insights related to the one or more assets. In an embodiment, the request 320 is generated by a computing device (e.g., a user computing device). For example, in an embodiment, the request 320 is generated via a visual display (e.g., a dashboard visualization) of a computing device. In another example, the request 320 is voice input generated via a microphone of a computing device. In another embodiment, the request 320 is generated by a controller associated with an asset (e.g., the edge devices 161*a*-161*n*). In another embodiment, the request 320 is generated by the processor 310. For example, in another embodiment, the request 320 is generated based on a schedule for updating the knowledge graph 316.

In one or more embodiments, in response to the request 320, the knowledge graph component 306 obtains aggregated operational technology data from one or more data sources associated with the one or more assets. The one or more data sources includes, for example, the process data historian 321, the limit repository 323, the operation monitoring 324, and/or the alarm management 326. For example, in one or more embodiments, the knowledge graph component 306 obtains the aggregated operational technology data from the process data historian 321, the limit repository 323, the operation monitoring 324, and/or the alarm management 326. In one or more embodiments, the knowledge graph component 306 obtains one or more portions of the aggregated operational technology data based on the one or more asset descriptors, the user identifier, the one or more metrics context identifiers, and/or the one or more time interval identifiers.

Additionally, in response to the request 320, the knowledge graph component 306 contextualizes the aggregated operational technology data to generate the knowledge graph data for the knowledge graph 316. In one or more embodiments, the knowledge graph component 306 contextualizes the aggregated operational technology data based on configuration data for the one or assets and/or one or more systems associated with the one or more assets. For example, in one or more embodiments, the knowledge graph component 306 contextualizes the aggregated operational technology data based on configuration data for the edge devices 161*a*-161*n* and/or the one or more enterprises 160*a*-160*n* that includes the edge devices 161*a*-161*n*. In an embodiment, the configuration data includes configuration information of an industrial plant system that includes one or more industrial assets. In one or more embodiments, the configuration data includes configuration data related to process thresholds, process limits, process targets, process tolerances, alarm criteria, planning criteria, quality criteria, environment criteria, manufacturing execution services, operations monitoring, asset performance monitoring, distributed control systems, alarm management, plant historians, integrity operating windows, assets tags, virtual processes for an asset, network layers, process characterizations, process measurements, process controls, Additionally or alternatively, in one or more embodiments, the knowledge graph component 306 contextualizes the aggregated operational technology data based on a set of contextualization rules for the one or more data sources. For example, in one or more embodiments, the set of contextualization rules for the one or more data sources includes rules for one or more tags, one or more labels, one or more attributes, and/or one or more other classifications to contextualize the aggregated operational technology data. In one or more embodiments, the set of contextualization rules for the one or more data sources includes rules for one or more weights to determine one or more tags, one or more labels, one or more attributes, and/or one or more other classifications to contextualize the aggregated operational technology data. In one or more embodiments, the set of contextualization rules are a set of contextualization rules for one or more data formats associated with the one or more data sources. For example, in one or more embodiments, the set of contextualization rules includes respective parsing rules and/or classification rules for one or more data formats. In an embodiment, a data format is a data format for a data file that includes operational technology data associated with the process data historian 321, the limit repository 323, the operation monitoring 324, and/or the alarm management 326. In certain embodiments, the knowledge graph component 306 parses alarm limit data, planning limit data, quality limit data, environment limit data, or other limit data for the one or more assets based on the configuration data for the one or assets and/or the set of contextualization rules for the one or more data sources. In certain embodiments, the knowledge graph component 306 parses operation deviation data associated with monitoring of the one or more assets based on the configuration data for the one or assets and/or the set of contextualization rules for the one or more data sources. In certain embodiments, the knowledge graph component 306 parses alarm history data associated with the one or more assets based on the configuration data for the one or assets and/or the set of contextualization rules for the one or more data sources.

In one or more embodiments, the set of contextualization rules for the one or more data sources identifies a type of contextualization technique to employ for the respective data sources. In one or more embodiments, the knowledge graph component 306 parses the aggregated operational technology data based on one or more parameters associated with a contextualization technique associated with the set of contextualization rules. A type of contextualization technique includes, in one or more embodiments, a knowledge graph embedding technique, a knowledge representation learning technique, a fuzzy matching technique, a clustering technique, a statistical relational learning technique, a machine learning technique, a deep learning technique, and/or another type of contextualization technique. In one or more embodiments, the knowledge graph component 306 employs one or more machine learning techniques to determine the one or more tags, one or more labels, one or more attributes, and/or one or more other classifications to contextualize the aggregated operational technology data. In an embodiment, the knowledge graph component 306 performs a fuzzy matching technique with respect to the aggregated operational technology data to determine the one or more tags, one or more labels, one or more attributes, and/or one or more other classifications to contextualize the aggregated operational technology data. In one or more embodiments, the knowledge graph component 306 contextualizes the aggregated operational technology data based on the user identifier. For example, in an embodiment, the knowledge graph component 306 contextualizes the aggregated operational technology data based on a set of contextualization rules configured for the user identifier. In certain embodiments, the knowledge graph component 306 parses the aggregated operational technology data based on metadata associated with the user identifier. Additionally or alternatively, in certain embodiments, the knowledge graph component 306 parses the aggregated operational technology data based on metadata associated with the one or more assets. In certain embodiments, the knowledge graph component 306 selects the knowledge graph 316 from a set of knowledge graphs based on the user identifier.

Additionally, the knowledge graph component 306 allocates the knowledge graph data within the knowledge graph 316. In one or more embodiments, the knowledge graph component 306 employs a recurrent neural network to map data into the knowledge graph 316. In certain embodiments, the knowledge graph component 306 organizes the knowledge graph data based on an ontological data structure that captures relationships among respective knowledge graph data portions within the knowledge graph 316. In certain embodiments, the knowledge graph component 306 allocates the knowledge graph data within the knowledge graph 316 based on the user identifier.

In one or more embodiments, the knowledge graph component 306 additionally or alternatively obtains one or more insights with respect to the knowledge graph data allocated within the knowledge graph 316. For example, in one or more embodiments, the knowledge graph component 306 correlates aspects of aggregated operational technology data within the knowledge graph 318 to provide the one or more insights. In one or more embodiments, the knowledge graph component 306 correlates aspects of aggregated operational technology data within the knowledge graph 318 based on the one or more asset descriptors, the user identifier, the one or more metrics context identifiers, and/or the one or more time interval identifiers. In certain embodiments, the aspects of the aggregated operational technology data correlated by the knowledge graph component 306 includes features and/or attributes of the of aggregated operational technology data. In one or more embodiments, the knowledge graph component 306 performs a machine learning process (e.g., a deep learning process) to determine one or more insights with respect to the knowledge graph 316. For example, in certain embodiments, the knowledge graph component 306 employs regression analysis and/or one or more clustering techniques to determine one or more insights associated with the knowledge graph 316. In one or more embodiments, the knowledge graph component 306 performs the machine learning process to determine one or more categories and/or one or more patterns associated with the knowledge graph 316.

The action component 308 performs one or more actions based on the one or more insights associated with the knowledge graph 316. For instance, in one or more embodiments, the action component 308 generates action data 322 associated with the one or more actions. In one or more embodiments, the action component 308 additionally employs a scoring model based on different metrics from historical analysis with respect to the knowledge graph 316. Additionally or alternatively, in one or more embodiments, the action component 308 additionally employs a scoring model based on different metrics from previous actions to determine the one or more actions. For example, in one or more embodiments, the scoring model employs weights for different metrics, different conditions, and/or different rules.

The operational limit component 338 additionally or alternatively performs one or more actions based on the one or more insights associated with the knowledge graph 316. For example, in one or more embodiments, the operational limit component 338 adjusts one or more operational limits for the one or more assets based on the one or more insights associated with the knowledge graph 316. The operational limits are, for example, one or more operational limits for one or more processes related to the one or more assets. For example, the operational limits include, for example, one or more alarm limits for one or more processes performed by the one or more assets, one or more planning limits for one or more operational plans associated with the one or more assets, one or more quality limits for one or more processes performed by the one or more assets, one or more environment limits for one or more processes performed by the one or more assets, one or more safety limits for one or more processes performed by the one or more assets, and/or one or more other types of operational limits related to the one or more assets. In another embodiment, an action from the one or more actions includes transmitting, to a computing device, one or more notifications associated with the one or more insights. In another embodiment, an action from the one or more actions includes updating one or more portions of the knowledge graph 316 based on the one or more insights. In another embodiment, an action from the one or more actions includes determining one or more features associated with the one or more insights. In another embodiment, an action from the one or more actions includes performing one or more actions with respect to the one or more assets based on the one or more insights. In another embodiment, an action from the one or more actions includes predicting, based on the one or more insights, a condition for the one or more assets. In another embodiment, an action from the one or more actions includes adjusting, based on the one or more insights, one or more limit settings and/or adjusting one or more processes associated with the one or more assets. In another embodiment, an action from the one or more actions includes determining, based on the one or more insights, likelihood of success for a given scenario associated with the one or more assets. In another embodiment, an action from the one or more actions includes providing an optimal process condition for the one or more assets. For example, in another embodiment, an action from the one or more actions includes adjusting a set-point and/or a schedule for the one or more assets. In another embodiment, an action from the one or more actions includes one or more corrective actions with respect to the one or more assets. In another embodiment, an action from the one or more actions includes providing an optimal maintenance option for the one or more assets. In another embodiment, an action from the one or more actions includes an action associated with the application services layer 225, the applications layer 230, and/or the core services layer 235.

In one or more embodiments, the operational limit component 338 generates one or more operational limit recommendations based on the one or more insights. Furthermore, the operational limit component 338 adjusts the one or more operational limits for the one or more assets in response to determining that a degree of deviation for the one or more operational limits satisfies a defined criterion. The operational limit component 338 additionally or alternatively adjusts the one or more operational limits for the one or more assets in response to determining that adjustment of the one or more operational limits provides a certain degree of optimization for one or more processes performed by the one or more assets. In one or more embodiments, the operational limit component 338 generates one or more integrity operating window recommendations for the one or more assets based on the one or more insights. Furthermore, the operational limit component 338 adjusts the one or more operational limits based on the one or more integrity operating window recommendations. An integrity operating window includes, for example, a first operating limit (e.g., a lower limit) and a second operating limit (e.g., an upper limit) to define a range of limits for optimal performance of an asset and/or a process related to the asset. In one or more embodiments, the operational limit component 338 predicts one or more operating conditions for the one or more assets based on the one or more insights. Furthermore, the operational limit component 338 adjusts one or more operational limits for the one or more assets based on the one or more operating conditions for the one or more assets. In one or more embodiments, the operational limit component 338 determines, based on the one or more insights, a degree of correlation between two or more portions of the aggregated operational technology data within the knowledge graph 316. Furthermore, the knowledge graph component 306 updates the knowledge graph data structure based on the one or more insights in response to a determination that the degree of correlation corresponds to a correlation threshold value.

The dashboard visualization component 348 additionally or alternatively performs one or more actions based on the one or more insights associated with the knowledge graph 316. In one or more embodiments, the dashboard visualization component 348 provides a dashboard visualization to an electronic interface of a computing device. In one or more embodiments, the dashboard visualization comprises visualization data for the one or more insights associated with the knowledge graph 316. In one or more embodiments, the knowledge graph component 306 determines a predicted operating state for the one or more assets based on the one or more insights and the dashboard visualization component 348 configures the dashboard visualization based on the predicted operating state for the one or more assets. For example, in one or more embodiments, the knowledge graph component 306 determines the predicted operating state based on one or more relationships between attributes, features, different data types, different data nodes, and/or different portions of the aggregated operational technology data within the knowledge graph data structure. The predicted operating state can correspond to a predicted set of operational settings and/or levels for the one or more assets. In one or more embodiments, the knowledge graph component 306 determines, based on the one or more insights, solution data for a predicted event associated with the one or more assets. In one or more embodiments, the solution data includes one or more recommended changes, one or more recommended configurations, one or more recommended operational settings, and/or one or more other solutions for the one or more assets to avoid the predicted event. The predicted event may be an undesirable event related to the one or more assets that reduces performance for the one or more assets. Furthermore, the dashboard visualization component 348 configures the dashboard visualization based on the solution data. In one or more embodiments, the dashboard visualization component 348 filters the visualization data for the dashboard visualization based on the user identifier, the one or more metrics context identifiers, and/or the one or more time interval identifiers. In one or more embodiments, the knowledge graph component 306 determines one or more operational limits for the one or more assets based on the one or more insights. Furthermore, the dashboard visualization component 348 displays one or more graphical elements associated with the one or more operational limits via the dashboard visualization.

In certain embodiments, the dashboard visualization component 348 adjusts, via one or more actions performed with respect to the dashboard visualization, one or more operational limits for the one or more assets based on the one or more insights associated with the knowledge graph 316. The operational limits are, for example, one or more operational limits for one or more processes related to the one or more assets. For example, the operational limits include, for example, one or more alarm limits for one or more processes performed by the one or more assets, one or more planning limits for one or more operational plans associated with the one or more assets, one or more quality limits for one or more processes performed by the one or more assets, one or more environment limits for one or more processes performed by the one or more assets, one or more safety limits for one or more processes performed by the one or more assets, and/or one or more other types of operational limits related to the one or more assets.

In one or more embodiments, the dashboard visualization includes one or more metrics determined based on the knowledge graph 316. In one or more embodiments, the dashboard visualization displays one or more prioritized actions for the one or more assets determined based on the knowledge graph 316. In one or more embodiments, the action data 322 and/or the dashboard visualization associated with the action data 322 is configured based on one or more relationships associated with the knowledge graph 316. In one or more embodiments, the dashboard visualization presents one or more dashboard visualization elements associated with process data, operations data, alarm data, planning data, quality data, sensor data, control data, environment data, labor management data, warehouse execution data, inventory data, warehouse management, machine control data, and/or other data associated with the one or more assets. In one or more embodiments, the dashboard visualization filters one or more events associated with the one or more assets based on the one or more insights. In one or more embodiments, the dashboard visualization is configured for real-time collaboration between two or more computing devices based on the one or more insights.

Figure 4:
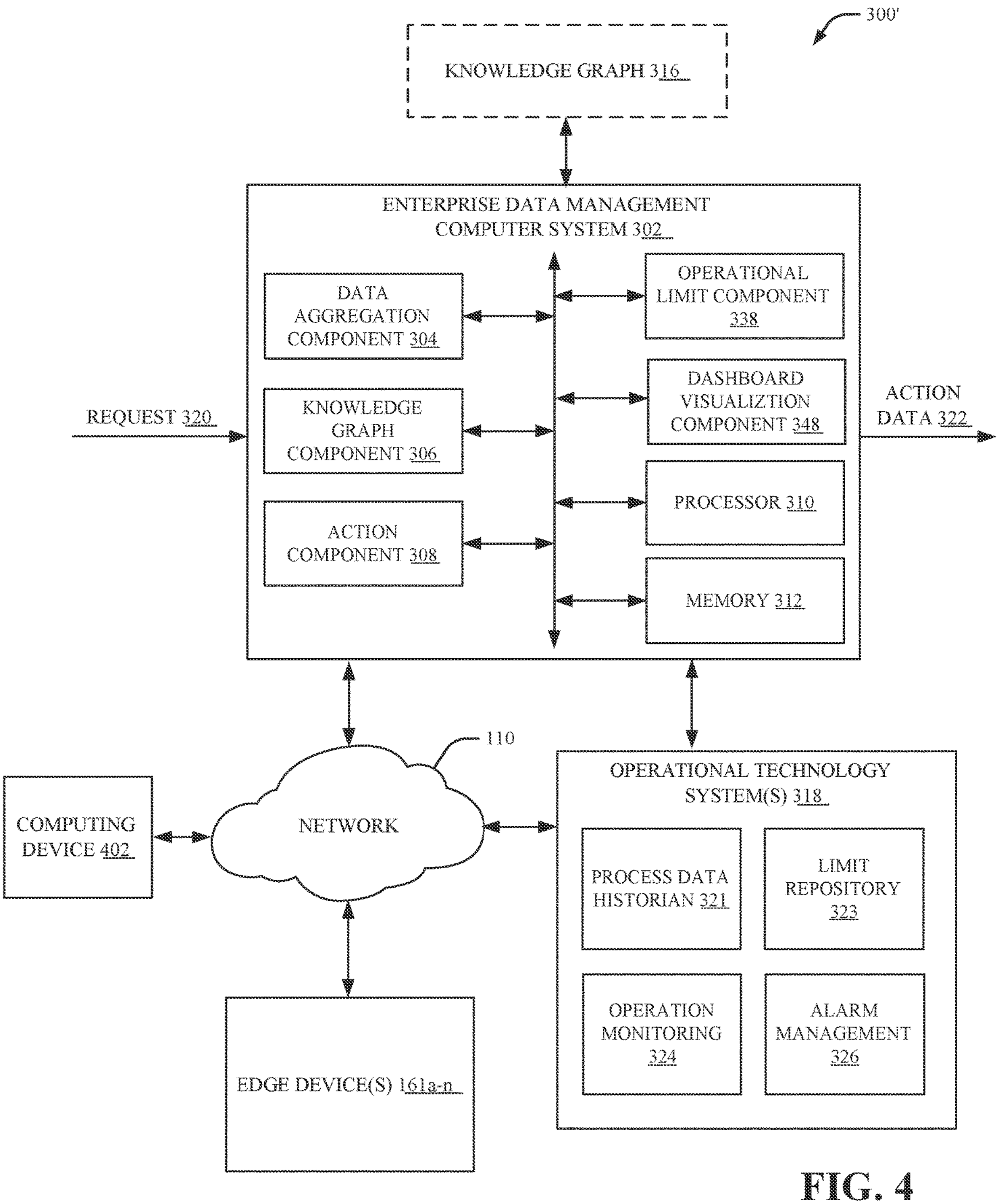
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the enterprise data management computer system 302, the edge devices **161*a*-161*n*, the one or more operational technology systems 318 and/or a computing device 402. In one or more embodiments, the enterprise data management computer system 302 is in communication with the edge devices 161*a*-161*n* and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the enterprise data management computer system 302. In one or more embodiments, the computing device 402 generates the request 320. For example, in one or more embodiments, the request 320 is generated via a visual display (e.g., a user interface) of the computing device 402. In another embodiment, the request 320 is generated via one or more microphones of the computing device 402 and/or one or more microphones communicatively coupled to the computing device 402. In another embodiment, the request 320 is generated via the edge devices 161*a*-161*n* and/or a processing device (e.g., a controller) communicatively coupled to the edge devices 161*a*-161*n***.

In one or more embodiments, the action component 308, the operational limit component 338, and/or the dashboard visualization component 348 communicates the action data 322 to the computing device 402. For example, in one or more embodiments, the action data 322 includes one or more visual elements for a visual display (e.g., a user-interactive electronic interface) of the computing device 402 that renders a visual representation of the one or more insights. In one or more other embodiments, the action component 308 transmits the action data 322 to the edge devices **161*a*-161*n* and/or a processing device (e.g., a controller) communicatively coupled to the edge devices 161*a*-161*n* to, for example, alter one or more settings and/or one or more processes for the one or more assets. In one or more embodiments, the action data 322 includes one or more visual elements for a visual display (e.g., a user-interactive electronic interface) of the computing device 402 that renders a visual representation of prioritized actions for the one or more assets. In certain embodiments, the visual display of the computing device 402 displays one or more graphical elements associated with the action data 322. In another example, in one or more embodiments, the action data 322 includes one or notifications associated with the one or more metrics and/or the prioritized actions for the one or more assets. In one or more embodiments, the action data 322 allows a user associated with the computing device 402 to make decisions and/or perform one or more actions with respect to the one or more assets. In one or more embodiments, the action data 322 allows a user associated with the computing device 402 to control the one or more portions of the one or more assets (e.g., one or more portions of the edge devices 161*a*-161*n*). In one or more embodiments, the action data 322 allows a user associated with the computing device 402** to generate one or more work orders for the one or more assets.

Figure 5:
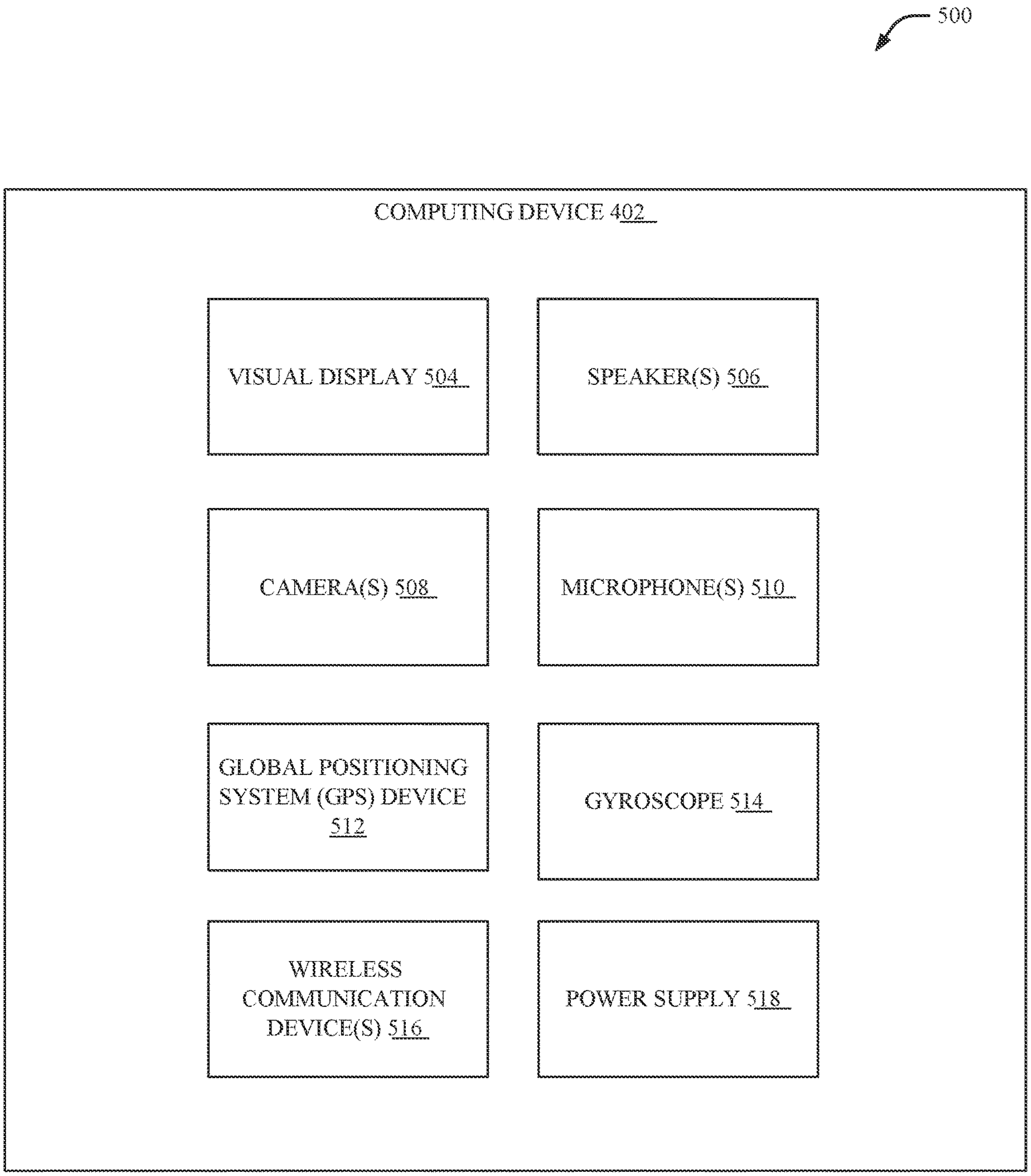
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more metrics. The computing device 402 includes mechanical components, electrical components, hardware components and/or software components to facilitate determining prioritized actions and/or one or more metrics associated with the asset data 314. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of the dashboard visualization data. In one or more embodiments, the computing device 402 displays an electronic interface (e.g., a graphical user interface) associated with an asset performance management platform. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. In certain embodiments, the one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the action data 322 associated with the one or more insights related to the one or more assets is presented via the visual display 504 and/or the one or more speakers 506.

Figure 6:
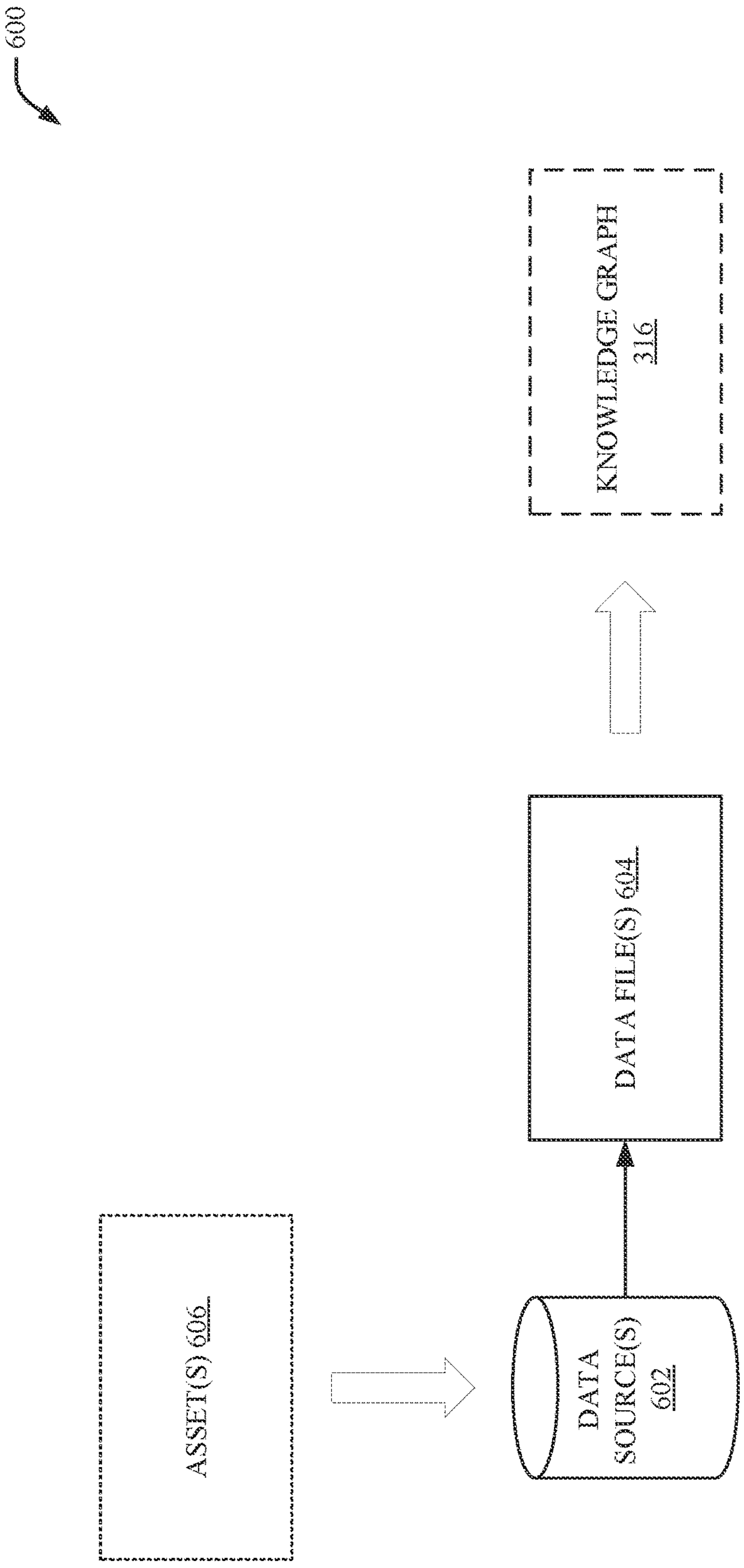
FIG. 6 illustrates a system for generating a knowledge graph, in accordance with one or more embodiments described herein.

FIG. 6 illustrates a system 600 according to one or more described features of one or more embodiments of the disclosure. The system 600 includes the knowledge graph 316. In one or more embodiments, knowledge graph data for the knowledge graph 316 is generated based on one or more data sources 602. The one or more data sources 602 are one or more data sources for one or more assets 606. In one or more embodiments, the one or more assets 606 correspond to the edge devices 161*a*-161*n*. In one or more embodiments, the one or more data sources 602 correspond to respective data sources for the process data historian 321, the limit repository 323, the operation monitoring 324, and/or the alarm management 326. Additionally or alternatively, in one or more embodiments, the one or more data sources 602 correspond to respective data sources for a manufacturing execution services associated with the one or more assets 606, asset performance monitoring associated with the one or more assets 606, a distributed control system associated with the one or more assets 606, a network system associated with the one or more assets 606, a plant control network associated with the one or more assets 606, a camera system associated with the one or more assets 606, site schematics associated with the one or more assets 606, and/or another system associated with the one or more assets 606. In one or more embodiments, data from the one or more data sources 602 are stored in one or more data files 604. In certain embodiments, respective data from respective data sources 602 is stored in respective data files 604.

In one or more embodiments, the knowledge graph component 306 contextualizes operational technology data aggregated from the one or more data sources 602 and/or the one or more data files 604. In one or more embodiments, the knowledge graph component 306 contextualizes the operational technology data based on configuration data for the one or more assets 606 and/or a set of contextualization rules for the one or more data sources 602. In one or more embodiments, the configuration data for the one or more assets 606 includes configuration data related to process thresholds, process limits, process targets, process tolerances, alarm criteria, planning criteria, quality criteria, environment criteria, manufacturing execution services, operations monitoring, asset performance monitoring, distributed control systems, alarm management, plant historians, integrity operating windows, assets tags, virtual processes for an asset, network layers, process characterizations, process measurements, and/or process controls associated with the one or more assets 606. In certain embodiments, the configuration data for the one or more assets 606 includes configuration data related to one or more processes (e.g., one or more control processes, one or more autonomous control processes, one or more control loops, one or more batch processes, one or more flow processes, etc.) related to the one or more assets 606, one or more controllers associated with the one or more assets 606, one or more servers associated with the one or more assets 606, input/output control for the one or more assets 606, and/or other control configurations associated with the one or more assets 606. In one or more embodiments, the set of contextualization rules for the one or more data sources 602 includes rules for one or more tags, one or more labels, one or more attributes, and/or one or more other classifications to contextualize the operational technology data associated with the one or more data sources 602. In one or more embodiments, the set of contextualization rules for the one or more data sources includes rules for one or more weights to determine one or more tags, one or more labels, one or more attributes, and/or one or more other classifications to contextualize the operational technology data associated with the one or more data sources 602. In one or more embodiments, the set of contextualization rules are a set of contextualization rules for one or more data formats associated with the one or more data files 604. For example, in one or more embodiments, the set of contextualization rules includes respective parsing rules and/or classification rules based on a format of the one or more data files 604.

In an embodiment, the data sources 602 include a first data source associated with alarm performance management, a second data source associated with asset performance management, and a third data source associated with control performance management. Furthermore, in one or more embodiments, the knowledge graph component 306 weights first data associated with the first data source, second data associated with the second data source, and third data associated with the third data source in parallel to facilitate allocating the data within the knowledge graph 316. In certain embodiments, the knowledge graph component 306 contextualizes the first data associated with the first data source, second data associated with the second data source, and third data associated with the third data source based on a user identifier associated with the request 320. Additionally or alternatively, in certain embodiments, the knowledge graph component 306 contextualizes the first data associated with the first data source, second data associated with the second data source, and third data associated with the third data source based on one or more events associated with the one or more assets 606. In one or more embodiments, the knowledge graph 316 models ontological relationships between data from different levels of an enterprise system (e.g., enterprise level, industrial site level, process/asset level, etc.).

Figure 7:
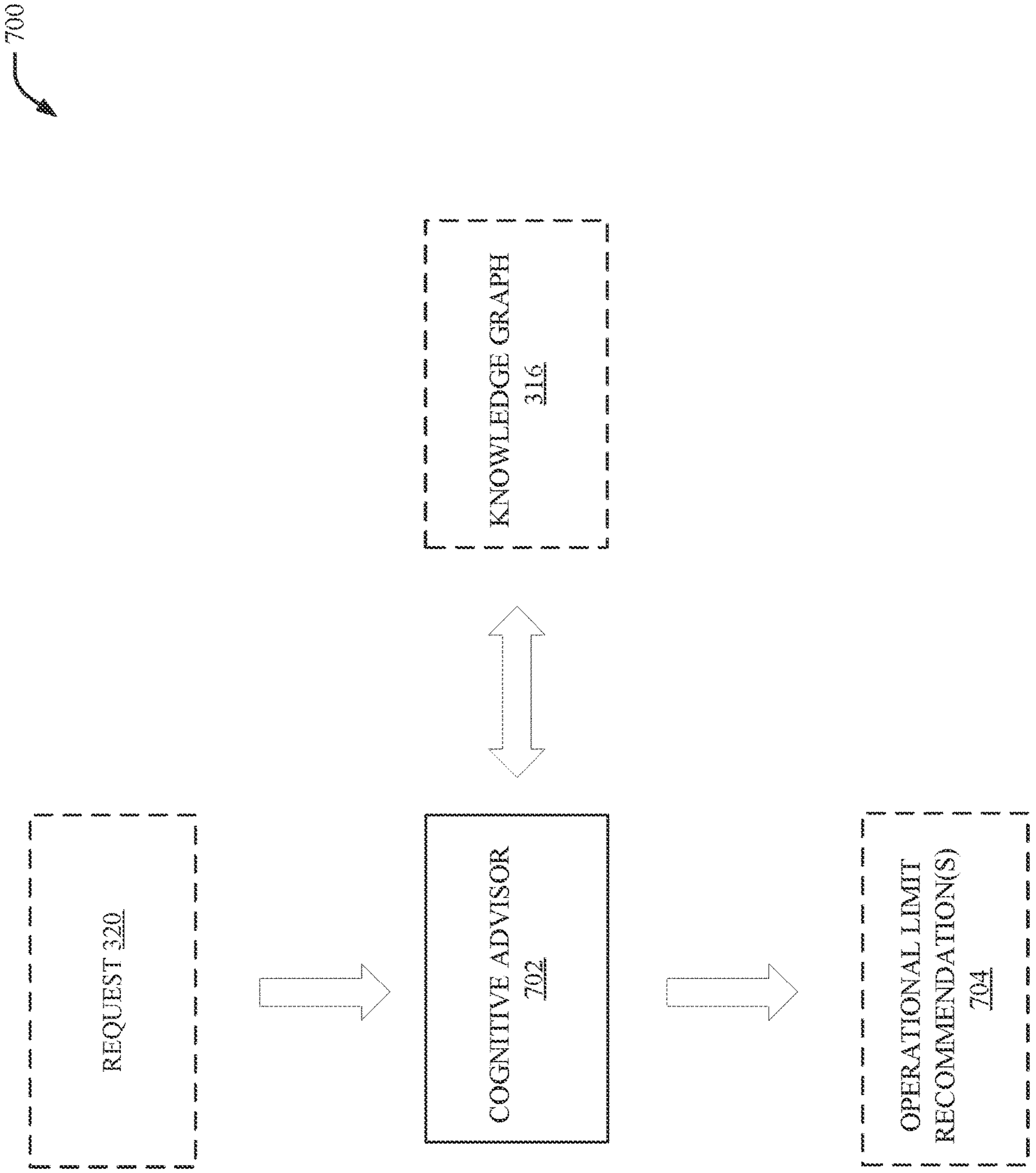
FIG. 7 illustrates a system related to a cognitive advisor, in accordance with one or more embodiments described herein.

FIG. 7 illustrates a system 700 according to one or more described features of one or more embodiments of the disclosure. The system 700 includes a cognitive advisor 702 that employs the knowledge graph 316 to determine one or more operational limit recommendations 704. For example, in various embodiments, the cognitive advisor 702 obtains one or more insights with respect to the knowledge graph 316 to determine the one or more operational limit recommendations 704. In various embodiments, the cognitive advisor 702 corresponds to the operational limit component 338 of the enterprise data management computer system 302. The one or more operational limit recommendations 704 are, for example, one or more operational limit recommendations for one or processes related to an asset. In certain embodiments, the one or more operational limit recommendations 704 include a recommended integrity operating window for a process related to an asset. For example, in certain embodiments, the one or more operational limit recommendations 704 include a first operating limit (e.g., a lower limit) and a second operating limit (e.g., an upper limit) to define a range of limits for optimal performance of an asset and/or a process related to the asset. In various embodiments, the cognitive advisor 702 determines the one or more operational limit recommendations 704 in response to receiving the request 320.

In one or more embodiments, knowledge graph data for the knowledge graph 316 is generated based on one or more data sources. The one or more data sources are one or more data sources for one or more assets. In one or more embodiments, the one or more assets correspond to the edge devices 161*a*-161*n*. In one or more embodiments, the one or more data sources correspond to respective data sources for the process data historian 321, the limit repository 323, the operation monitoring 324, and/or the alarm management 326. Additionally or alternatively, in one or more embodiments, the one or more data sources correspond to respective data sources for a manufacturing execution services associated with the one or more assets, asset performance monitoring associated with the one or more assets, a distributed control system associated with the one or more assets, a network system associated with the one or more assets, a plant control network associated with the one or more assets, a camera system associated with the one or more assets, site schematics associated with the one or more assets, and/or another system associated with the one or more assets. In one or more embodiments, data from the one or more data sources are stored in one or more data files. In certain embodiments, respective data from respective data sources is stored in respective data files.

In one or more embodiments, the knowledge graph component 306 contextualizes operational technology data aggregated from the one or more data sources and/or the one or more data files. In one or more embodiments, the knowledge graph component 306 contextualizes the operational technology data based on configuration data for the one or more assets and/or a set of contextualization rules for the one or more data sources. In one or more embodiments, the configuration data for the one or more assets includes configuration data related to process thresholds, process limits, process targets, process tolerances, alarm criteria, planning criteria, quality criteria, environment criteria, manufacturing execution services, operations monitoring, asset performance monitoring, distributed control systems, alarm management, plant historians, integrity operating windows, assets tags, virtual processes for an asset, network layers, process characterizations, process measurements, and/or process controls associated with the one or more assets. In certain embodiments, the configuration data for the one or more assets includes configuration data related to one or more processes (e.g., one or more control processes, one or more autonomous control processes, one or more control loops, one or more batch processes, one or more flow processes, etc.) related to the one or more assets, one or more controllers associated with the one or more assets, one or more servers associated with the one or more assets, input/output control for the one or more assets, and/or other control configurations associated with the one or more assets. In one or more embodiments, the set of contextualization rules for the one or more data sources includes rules for one or more tags, one or more labels, one or more attributes, and/or one or more other classifications to contextualize the operational technology data associated with the one or more data sources. In one or more embodiments, the set of contextualization rules for the one or more data sources includes rules for one or more weights to determine one or more tags, one or more labels, one or more attributes, and/or one or more other classifications to contextualize the operational technology data associated with the one or more data sources. In one or more embodiments, the set of contextualization rules are a set of contextualization rules for one or more data formats associated with the one or more data files. For example, in one or more embodiments, the set of contextualization rules includes respective parsing rules and/or classification rules based on a format of the one or more data files.

Figure 8:
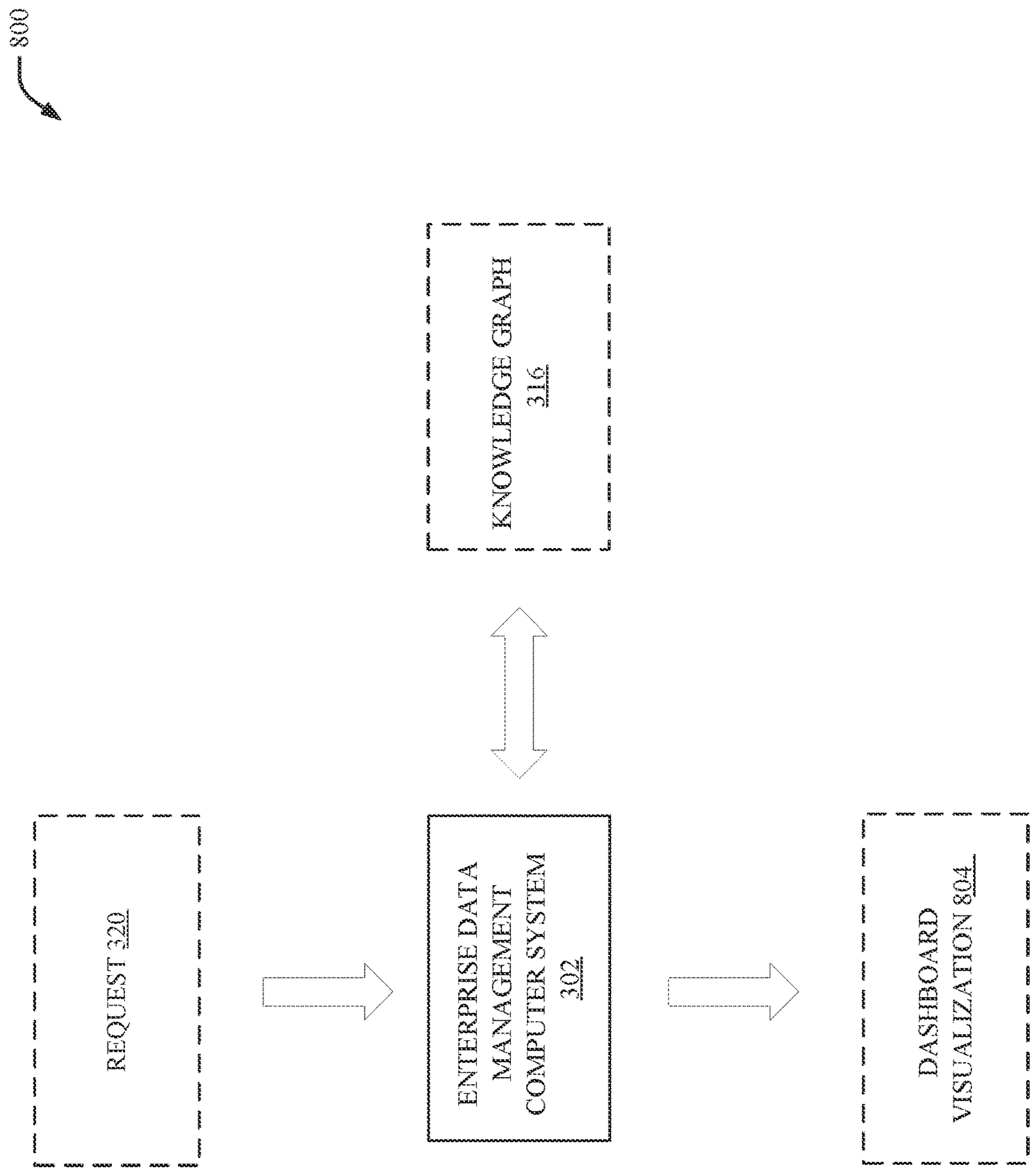
FIG. 8 illustrates a system related to a dashboard visualization, in accordance with one or more embodiments described herein.

FIG. 8 illustrates a system 800 according to one or more described features of one or more embodiments of the disclosure. The system 800 includes the enterprise data management computer system 302 that employs the knowledge graph 316 to determine a dashboard visualization 804. For example, in various embodiments, the enterprise data management computer system 302 obtains one or more insights with respect to the knowledge graph 316 to determine the dashboard visualization 804. In one or more embodiments, the dashboard visualization 804 is rendered via the visual display 504 of the computing device 402. In one or more embodiments, the dashboard visualization 804 the dashboard visualization includes visualization data for one or more insights associated with the knowledge graph 316. In various embodiments, the dashboard visualization 804 presents one or more operational limit recommendations for one or processes related to an asset. In certain embodiments, the one or more operational limit recommendations include a recommended integrity operating window for a process related to an asset. For example, in certain embodiments, the one or more operational limit recommendations include a first operating limit (e.g., a lower limit) and a second operating limit (e.g., an upper limit) to define a range of limits for optimal performance of an asset and/or a process related to the asset. In various embodiments, the enterprise data management computer system 302 generates the dashboard visualization 804 in response to receiving the request 320.

In one or more embodiments, knowledge graph data for the knowledge graph 316 is generated based on one or more data sources. The one or more data sources are one or more data sources for one or more assets. In one or more embodiments, the one or more assets correspond to the edge devices 161*a*-161*n*. In one or more embodiments, the one or more data sources correspond to respective data sources for the process data historian 321, the limit repository 323, the operation monitoring 324, and/or the alarm management 326. Additionally or alternatively, in one or more embodiments, the one or more data sources correspond to respective data sources for a manufacturing execution services associated with the one or more assets, asset performance monitoring associated with the one or more assets, a distributed control system associated with the one or more assets, a network system associated with the one or more assets, a plant control network associated with the one or more assets, a camera system associated with the one or more assets, site schematics associated with the one or more assets, and/or another system associated with the one or more assets. In one or more embodiments, data from the one or more data sources are stored in one or more data files. In certain embodiments, respective data from respective data sources is stored in respective data files.

In one or more embodiments, the knowledge graph component 306 contextualizes operational technology data aggregated from the one or more data sources and/or the one or more data files. In one or more embodiments, the knowledge graph component 306 contextualizes the operational technology data based on configuration data for the one or more assets and/or a set of contextualization rules for the one or more data sources. In one or more embodiments, the configuration data for the one or more assets includes configuration data related to process thresholds, process limits, process targets, process tolerances, alarm criteria, planning criteria, quality criteria, environment criteria, manufacturing execution services, operations monitoring, asset performance monitoring, distributed control systems, alarm management, plant historians, integrity operating windows, assets tags, virtual processes for an asset, network layers, process characterizations, process measurements, and/or process controls associated with the one or more assets. In certain embodiments, the configuration data for the one or more assets includes configuration data related to one or more processes (e.g., one or more control processes, one or more autonomous control processes, one or more control loops, one or more batch processes, one or more flow processes, etc.) related to the one or more assets, one or more controllers associated with the one or more assets, one or more servers associated with the one or more assets, input/output control for the one or more assets, and/or other control configurations associated with the one or more assets. In one or more embodiments, the set of contextualization rules for the one or more data sources includes rules for one or more tags, one or more labels, one or more attributes, and/or one or more other classifications to contextualize the operational technology data associated with the one or more data sources. In one or more embodiments, the set of contextualization rules for the one or more data sources includes rules for one or more weights to determine one or more tags, one or more labels, one or more attributes, and/or one or more other classifications to contextualize the operational technology data associated with the one or more data sources. In one or more embodiments, the set of contextualization rules are a set of contextualization rules for one or more data formats associated with the one or more data files. For example, in one or more embodiments, the set of contextualization rules includes respective parsing rules and/or classification rules based on a format of the one or more data files.

Figure 9:
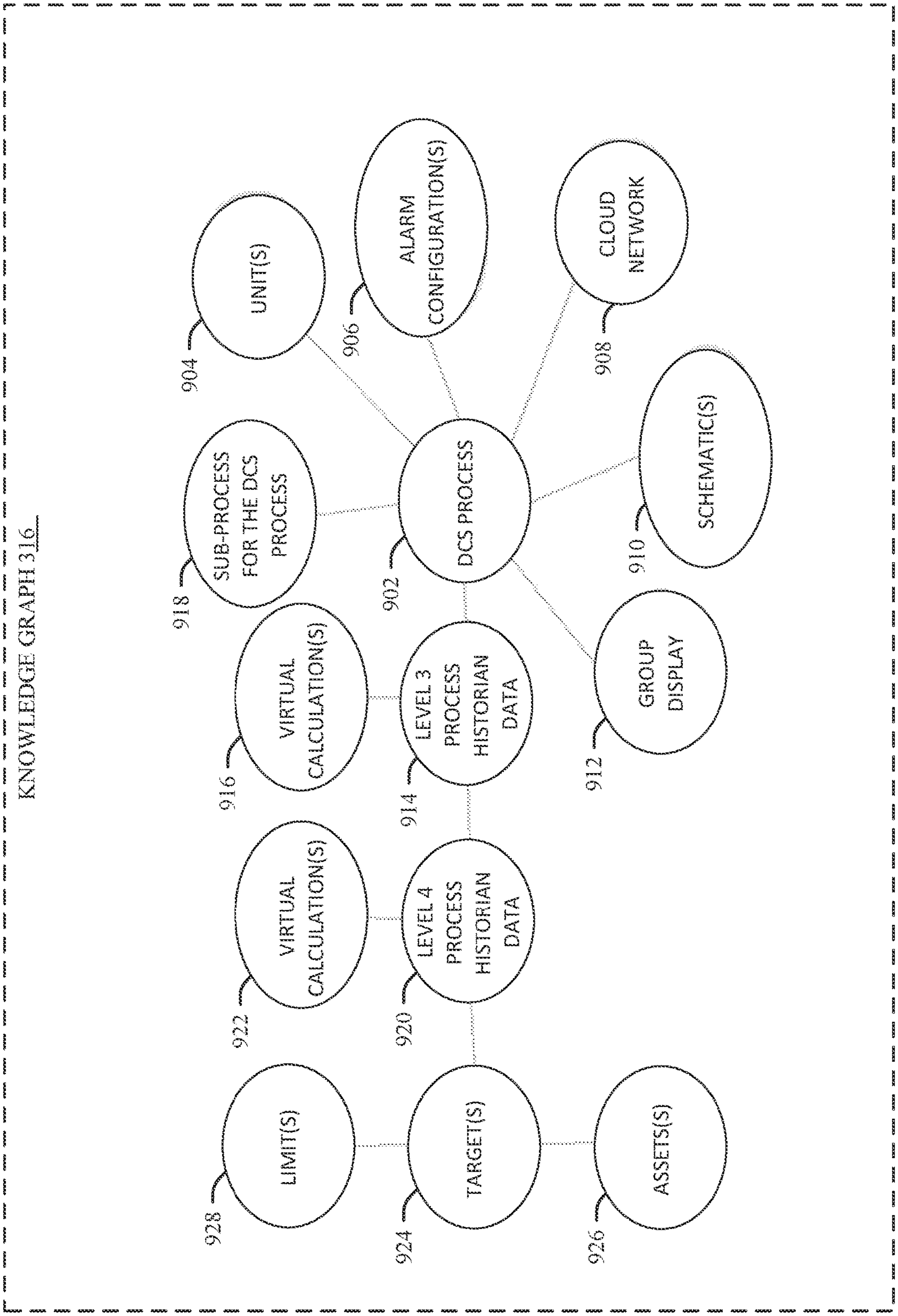
FIG. 9 illustrates an exemplary knowledge graph, in accordance with one or more embodiments described herein.

FIG. 9 illustrates a non-limiting embodiment of the knowledge graph 316 according to one or more described features of one or more embodiments of the disclosure. The knowledge graph 316 includes a set of nodes and/or a set of connectors that graphically represents data and respective ontological relationships between data associated with a distributed control system (DCS) process. The DCS process is, for example, a DCS process for one or more assets of an industrial plant. In one or more embodiments, the set of nodes correspond to knowledge graph data elements related to the DCS process. In a non-limiting embodiment, the knowledge graph 316 includes a node 902 that corresponds to the DCS process, a node 904 that corresponds to one or more units associated with the DCS process, a node 906 that corresponds to one or more alarm configurations for the DCS process, a node 908 that corresponds to a cloud network for the DCS process, a node 910 that corresponds to one or more schematics (e.g., one or more electrical schematics, one or more layout schematics, one or more mechanical schematics, etc.) for the DCS process, a node 912 that corresponds to a group display (e.g., computer graphics data) for the DCS process, a node 914 that corresponds to level 3 process historian data (e.g., level 3 process historian tag(s)) associated with production control for the DCS process, a node 916 that corresponds to one or more virtual calculations (e.g., one or more simulations and/or one or more virtual machine processes) for the production control associated with the DCS process, and/or a node 918 that corresponds to a sub-process (e.g., one or more DCS points) for the DCS process. Additionally, in a non-limiting embodiment, the knowledge graph 316 includes a node 920 that corresponds to level 4 process historian data (e.g., level 4 process historian tag(s)) associated with production scheduling for the DCS process, a node 922 that corresponds to one or more virtual calculations (e.g., one or more simulations and/or one or more virtual machine processes) for the production scheduling associated with the DCS process, a node 924 that corresponds to one or more targets for the DCS process, a node 926 that corresponds to one or more assets related to the DCS process, and/or a node 928 that corresponds to one or more limits for the DCS process. In one or more embodiments, connections between respective nodes of the knowledge graph 316 illustrate respective ontological relationships between data for the respective nodes.

Figure 10:
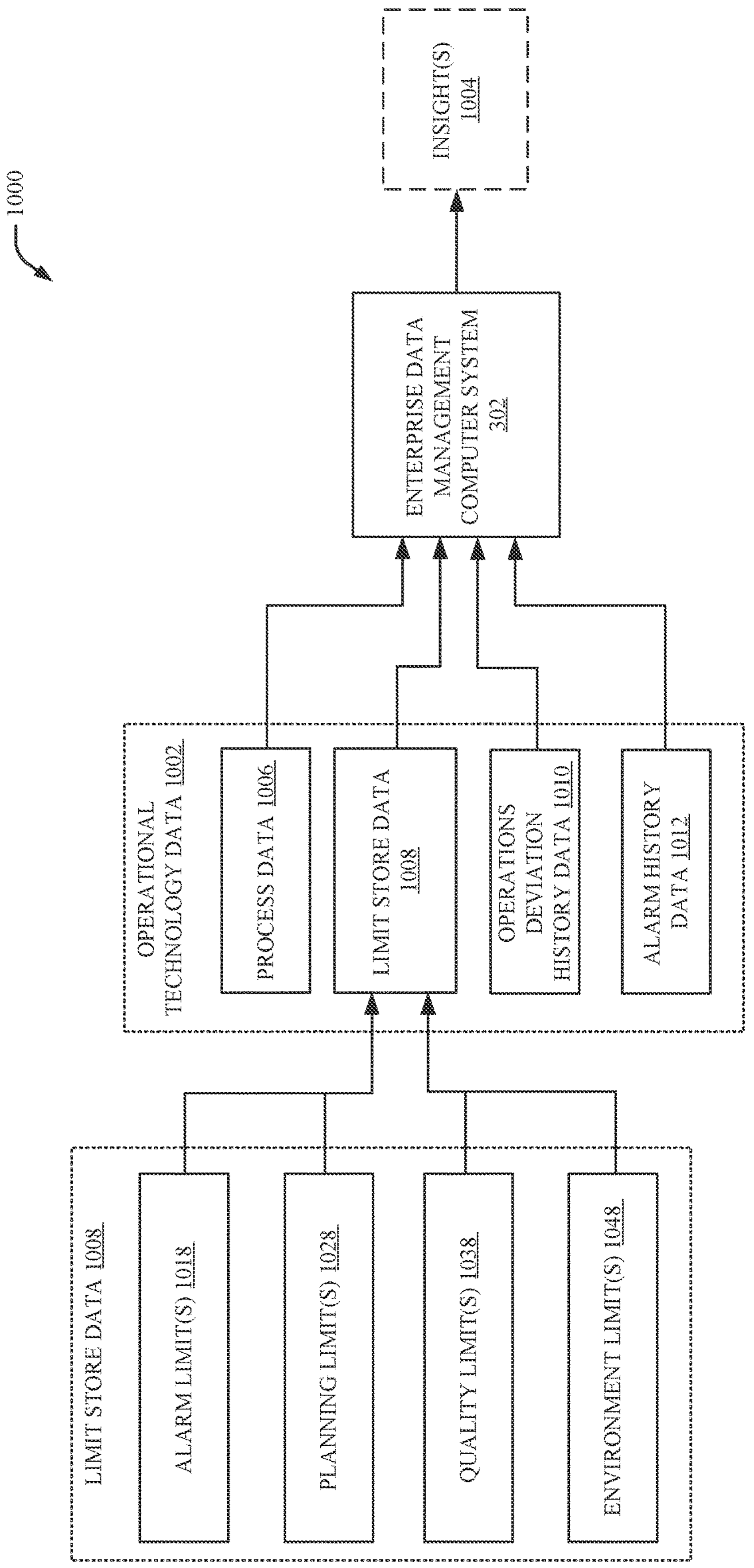
FIG. 10 illustrates a system for providing insights related to enterprise data management, in accordance with one or more embodiments described herein.

FIG. 10 illustrates a system 1000 according to one or more described features of one or more embodiments of the disclosure. The system 1000 includes the enterprise data management computer system 302. In one or more embodiments, the enterprise data management computer system 302 receives operational technology data 1002, contextualizes the operational technology data 1002 to generate knowledge graph data for the knowledge graph 316, and determines one or more insights 1004 based on ontological relationships with respect to knowledge graph data allocated within the knowledge graph 316. In various embodiments, the operational technology data 1002 can be consolidated data for the enterprise data management computer system 302. In an embodiment, the operational technology data 1002 includes process data 1006 associated with the process data historian 321, limit store data 1008 associated with the limit repository 323, operations deviation history data 1010 associated with the operation monitoring 324, and/or alarm history data 1012 associated with the alarm management 326. In one or more embodiments, the limit store data 1008 includes one or more alarm limits 1018 for the one or more assets, one or more planning limits 1028 for the one or more assets, one or more quality limits 1038 for the one or more assets, and/or one or more environment limits 1048 for the one or more assets. In one or more embodiments, the enterprise data management computer system 302 can be configured as an analytics engine to process the one or more alarm limits 1018, the one or more planning limits 1028, the one or more quality limits 1038, and/or the one or more environment limits 1048. In one or more embodiments, the one or more insights 1004 includes one or more recommendations for modifying one or more limits from the one or more alarm limits 1018, the one or more planning limits 1028, the one or more quality limits 1038, and/or the one or more environment limits 1048. In certain embodiments, the one or more insights 1004 includes one or more recommended corrections, one or more recommended thresholds, and/or one or more recommended tolerances for the one or more alarm limits 1018, the one or more planning limits 1028, the one or more quality limits 1038, and/or the one or more environment limits 1048.

Figure 11:
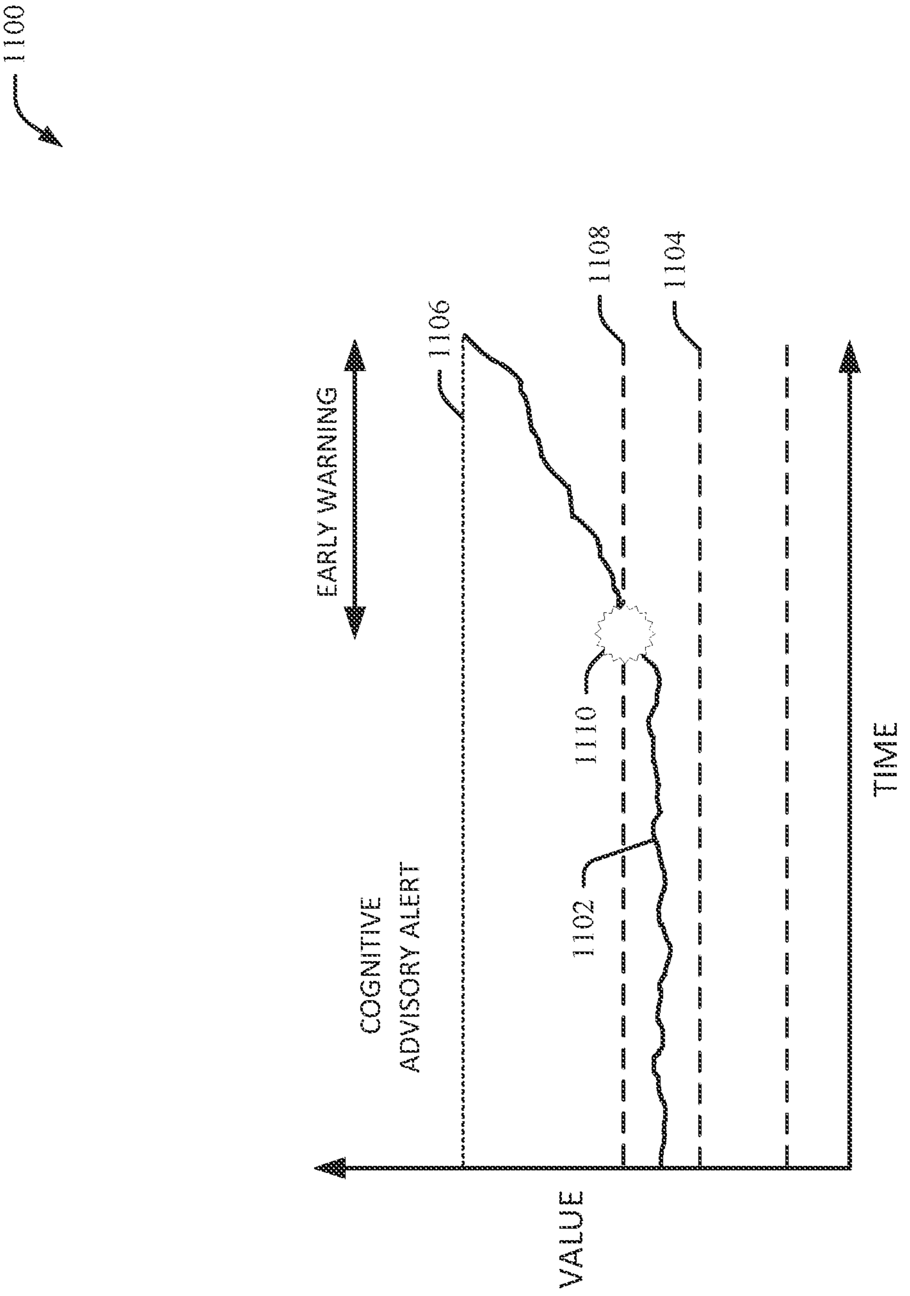
FIG. 11 illustrates an exemplary process visualization, in accordance with one or more embodiments described herein.

FIG. 11 illustrates a process visualization 1100 according to one or more described features of one or more embodiments of the disclosure. The process visualization 1100 is, for example, a visualization for operational technology data 1102 related to a process for an asset. In an embodiment, the process for the asset employs an integrity operating window for the process that includes a first operating limit 1104 (e.g., a lower limit) and a second operating limit 1106 (e.g., an upper limit) to define a range of limits for performance of the asset and/or the process for the asset. In one or more embodiments, the knowledge graph component 306 correlates aspects of aggregated operational technology data (e.g., aggregated operational technology data associated with the asset, the process for the asset, and/or the operational technology data 1102) within the knowledge graph 316 to provide one or more insights for the integrity operating window. Additionally, in one or more embodiments, the operational limit component 338 adjusts the integrity operating window based on the one or more insights associated with the knowledge graph 316. For example, in an embodiment, the operational limit component 338 determines a new operating limit 1108 (e.g., a new upper limit) based on an insight 1110 (e.g., an upper limit prediction) such that a new range of limits that includes the first operating limit 1104 and the new operating limit 1108 provide optimal performance for the asset and/or the process related to the asset. In certain embodiments, the new operating limit 1108 provides an early warning for a potential undesirable event associated with the asset and/or the process related to the asset. In one or more embodiments, an advisory alert associated with the new operating limit 1108 is generated.

Figure 12:
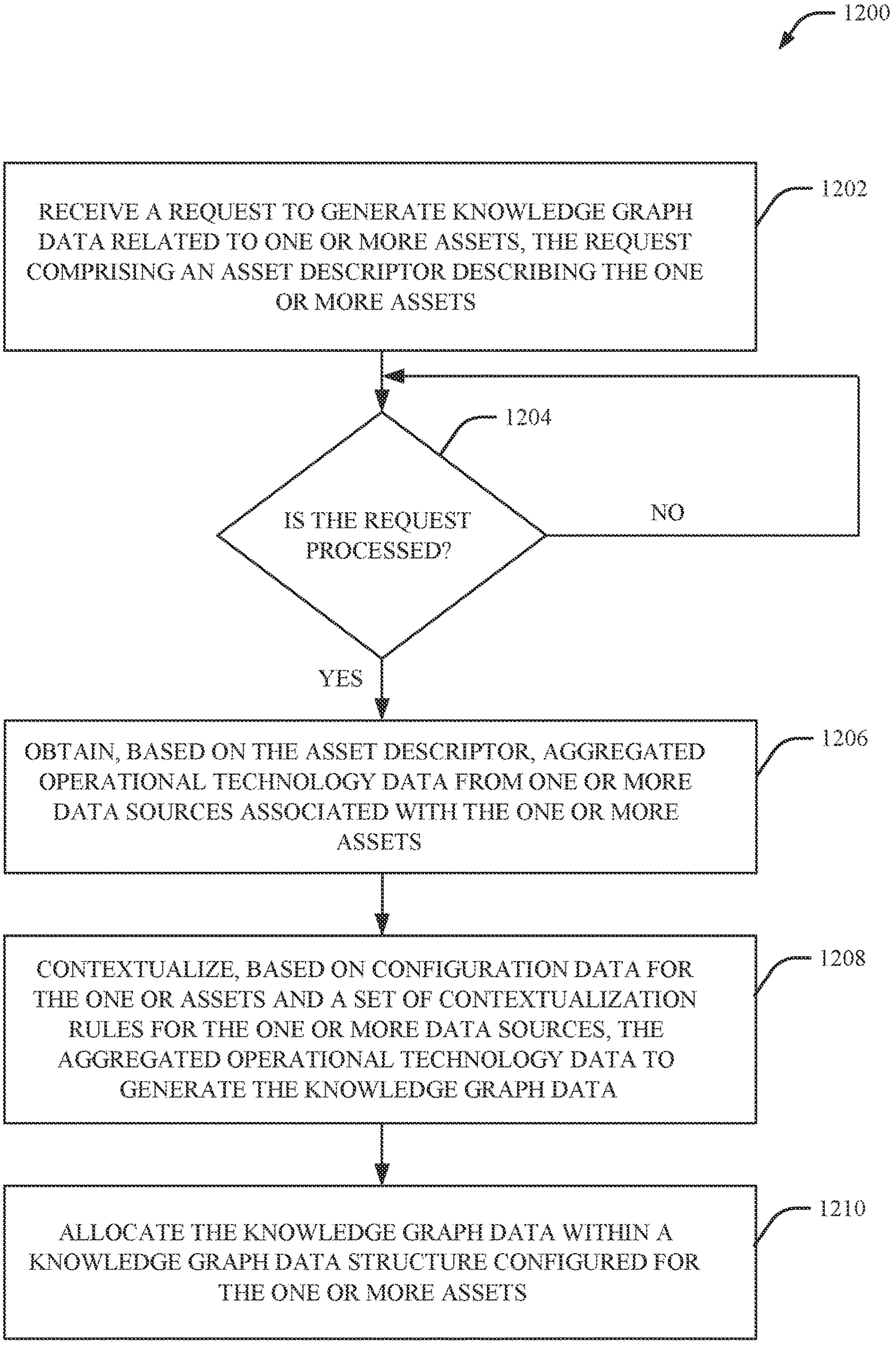
FIG. 12 illustrates a flow diagram for generating a knowledge graph for one or more assets, in accordance with one or more embodiments described herein.

FIG. 12 illustrates a method 1200 for generating a knowledge graph for one or more assets, in accordance with one or more embodiments described herein. The method 1200 is associated with the enterprise data management computer system 302, for example. For instance, in one or more embodiments, the method 1200 is executed at a device (e.g., the enterprise data management computer system 302) with one or more processors and a memory. In one or more embodiments, the method 1200 begins at block 1202 that receives (e.g., by the data aggregation component 304 and/or the knowledge graph component 306) a request to generate knowledge graph data related to one or more assets, the request comprising an asset descriptor describing the one or more assets. The request provides one or more technical improvements such as, but not limited to, facilitating interaction with a computing device and/or extended functionality for a computing device.

At block 1204, it is determined whether the request is processed. If no, block 1204 is repeated to determine whether the request is processed. If yes, the method 1200 proceeds to block 1206. In response to the request, the method 1200 includes a block 1206 that obtains (e.g., by the data aggregation component 304) aggregated operational technology data from one or more data sources associated with the one or more assets based on the asset descriptor. The obtaining the aggregated operational technology data provides one or more technical improvements such as, but not limited to, extended functionality for a computing device.

The method 1200 also includes a block 1208 that, in response to the request, contextualizes, based on configuration data for the one or assets and a set of contextualization rules for the one or more data sources (e.g., by the knowledge graph component 306), the aggregated operational technology data to generate the knowledge graph data. The contextualizing provides one or more technical improvements such as, but not limited to, improving accuracy of a knowledge graph data structure and/or performance of one or more assets. In one or more embodiments, the contextualizing includes contextualizing the aggregated operational technology data based on a set of contextualization rules for one or more data formats associated with the one or more data sources. In one or more embodiments, the contextualizing includes parsing the aggregated operational technology data based on metadata associated with the user identifier. In one or more embodiments, the contextualizing includes parsing the aggregated operational technology data based on metadata associated with the one or more assets. In one or more embodiments, the contextualizing includes parsing the aggregated operational technology data based on one or more parameters associated with a contextualization technique associated with the set of contextualization rules. In one or more embodiments, the contextualizing includes parsing alarm limit data, planning limit data, quality limit data, environment limit data, or other limit data for the one or more assets based on the configuration data for the one or assets and the set of contextualization rules for the one or more data sources. In one or more embodiments, the contextualizing includes parsing operation deviation data associated with monitoring of the one or more assets based on the configuration data for the one or assets and the set of contextualization rules for the one or more data sources. In one or more embodiments, the contextualizing includes parsing alarm history data associated with the one or more assets based on the configuration data for the one or assets and the set of contextualization rules for the one or more data sources.

The method 1200 also includes a block 1210 that, in response to the request, allocates (e.g., by the knowledge graph component 306) the knowledge graph data within a knowledge graph data structure configured for the one or more assets. The allocating provides one or more technical improvements such as, but not limited to, improving accuracy of a knowledge graph data structure and/or performance of one or more assets. In one or more embodiments, the allocating the knowledge graph data within the knowledge graph data structure includes organizing the knowledge graph data based on an ontological data structure that captures relationships among respective knowledge graph data portions within the knowledge graph data structure.

In one or more embodiments, the method 1200 further includes performing one or more actions with respect to the one or more assets based on the knowledge graph data structure. For example, the one or more action can include predicting one or more conditions for the one or more assets based on the knowledge graph data structure, adjusting one or more limit settings for the one or more assets based on the knowledge graph data structure, adjusting one or more process thresholds for the one or more assets based on the knowledge graph data structure, generating a user-interactive electronic interface that renders a visual representation of data related to the one or more assets based on the knowledge graph data structure, generating one or more notifications related to the one or more assets based on the knowledge graph data structure, and/or one or more other actions related to the one or more assets.

In one or more embodiments, the request further comprising a user identifier describing a user role for a user associated with the request. Additionally, in one or more embodiments and in response to the request, the method 1200 further includes contextualizing the aggregated operational technology data based on the user identifier. In one or more embodiments and in response to the request, the method 1200 further includes selecting the knowledge graph data structure for the knowledge graph data based on the user identifier. In one or more embodiments and in response to the request, the method 1200 further includes allocating the knowledge graph data within the knowledge graph data structure based on the user identifier.

In one or more embodiments, the method 1200 further includes obtaining one or more insights with respect to the knowledge graph data allocated within the knowledge graph data structure. In one or more embodiments, the method 1200 further includes generating a user-interactive electronic interface that renders a visual representation of the one or more insights. In one or more embodiments, the method 1200 further includes generating one or more notifications associated with the one or more insights. In one or more embodiments, the method 1200 further includes performing one or more actions with respect to the one or more assets based on the one or more insights. In one or more embodiments, the method 1200 further includes predicting one or more conditions for the one or more assets based on the one or more insights. In one or more embodiments, the method 1200 further includes adjusting one or more limit settings for the one or more assets based on the one or more insights. In one or more embodiments, the method 1200 further includes adjusting one or more process thresholds for the one or more assets based on the one or more insights.

Figure 13:
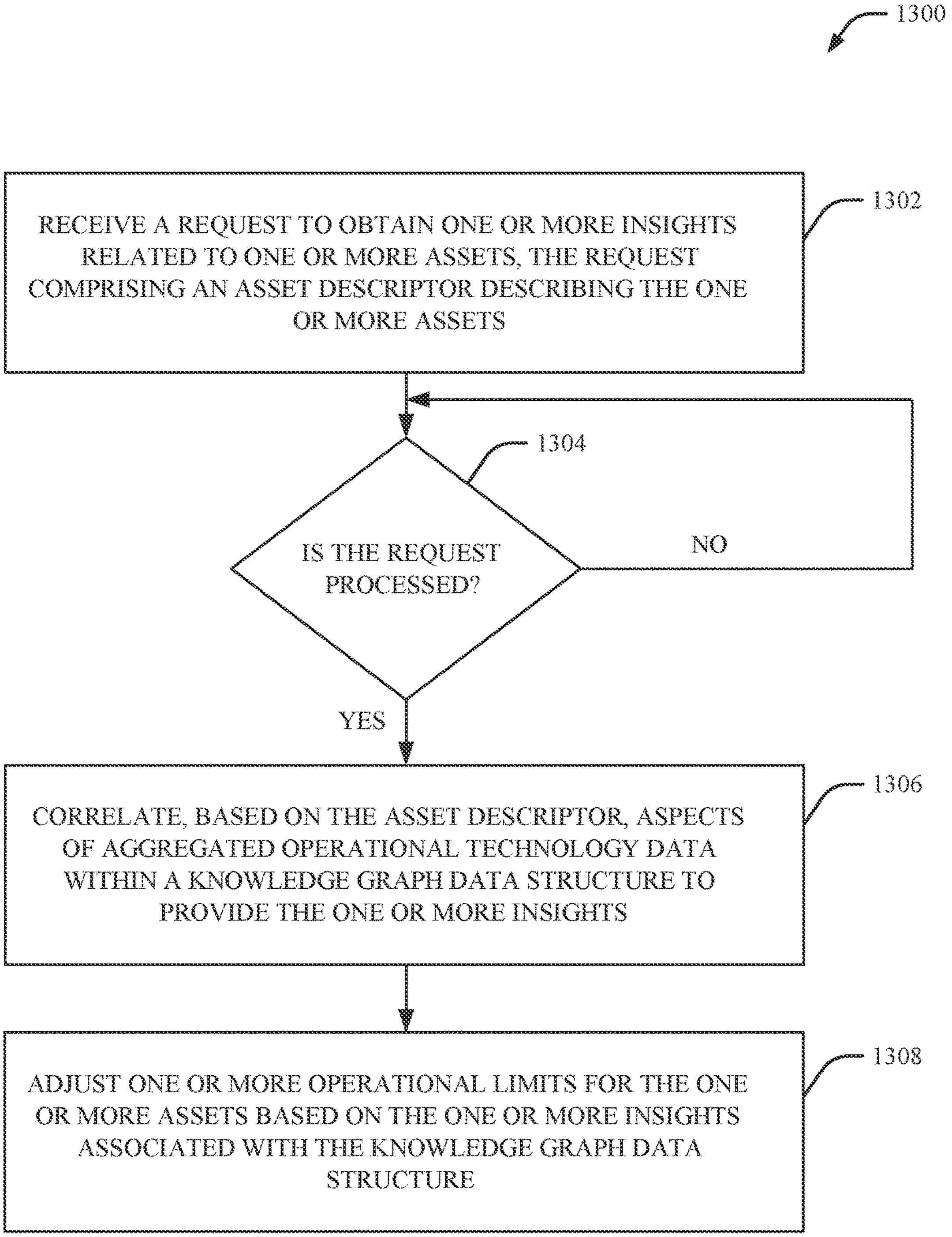
FIG. 13 illustrates a flow diagram for integrity operating window optimization for one or more assets, in accordance with one or more embodiments described herein.

FIG. 13 illustrates a method 1300 for integrity operating window optimization for one or more assets, in accordance with one or more embodiments described herein. The method 1300 is associated with the enterprise data management computer system 302, for example. For instance, in one or more embodiments, the method 1300 is executed at a device (e.g., the enterprise data management computer system 302) with one or more processors and a memory. In one or more embodiments, the method 1300 begins at block 1302 that receives (e.g., by the data aggregation component 304 and/or the knowledge graph component 306) a request to obtain one or more insights related to one or more assets, the request comprising an asset descriptor describing the one or more assets. The request provides one or more technical improvements such as, but not limited to, facilitating interaction with a computing device and/or extended functionality for a computing device.

At block 1304, it is determined whether the request is processed. If no, block 1304 is repeated to determine whether the request is processed. If yes, the method 1300 proceeds to block 1306. In response to the request, the method 1200 includes a block 1306 that correlates (e.g., by the knowledge graph component 306) aspects of aggregated operational technology data within a knowledge graph data structure, based on the asset descriptor, to provide the one or more insights. In one or more embodiments, the knowledge graph data structure is configured as an ontological data structure that captures relationships among respective aggregated operational technology data within the knowledge graph data structure. In one or more embodiments, attributes, features, different data types, different data nodes, and/or different portions of the aggregated operational technology data within the knowledge graph data structure are correlated to provide the one or more insights associated with the one or more assets. The correlating provides one or more technical improvements such as, but not limited to, extended functionality for a computing device and/or improving performance of one or more assets.

The method 1300 also includes a block 1308 that, in response to the request, adjusts (e.g., by the operational limit component 338) one or more operational limits for the one or more assets based on the one or more insights associated with the knowledge graph data structure. The adjusting provides one or more technical improvements such as, but not limited to, improving operational limits for one or more assets and/or improving performance of one or more assets. In one or more embodiments, the adjusting the one or more operational limits includes altering one or more alarm limits for one or more processes performed by the one or more assets. In one or more embodiments, the adjusting the one or more operational limits includes altering one or more planning limits for one or more operational plans associated with the one or more assets. In one or more embodiments, the adjusting the one or more operational limits includes altering one or more quality limits for one or more processes performed by the one or more assets. In one or more embodiments, the adjusting the one or more operational limits includes altering one or more environment limits for one or more processes performed by the one or more assets. In one or more embodiments, the adjusting the one or more operational limits includes altering one or more safety limits for one or more processes performed by the one or more assets.

In one or more embodiments, the method 1300 further includes generating one or more operational limit recommendations based on the one or more insights. In one or more embodiments, the method 1300 further includes adjusting the one or more operational limits for the one or more assets in response to determining that a degree of deviation for the one or more operational limits satisfies a defined criterion.

In one or more embodiments, the method 1300 further includes generating one or more operational limit recommendations based on the one or more insights. In one or more embodiments, the method 1300 further includes adjusting the one or more operational limits for the one or more assets in response to determining that adjustment of the one or more operational limits provides a certain degree of optimization for one or more processes performed by the one or more assets.

In one or more embodiments, the method 1300 further includes generating one or more integrity operating window recommendations for the one or more assets based on the one or more insights. In one or more embodiments, the method 1300 further includes adjusting the one or more operational limits based on the one or more integrity operating window recommendations.

In one or more embodiments, the method 1300 further includes predicting one or more operating conditions for the one or more assets based on the one or more insights. In one or more embodiments, the method 1300 further includes adjusting one or more operational limits for the one or more assets based on the one or more operating conditions for the one or more assets.

In one or more embodiments, the method 1300 further includes determining, based on the one or more insights, a degree of correlation between two or more portions of the aggregated operational technology data within the knowledge graph data structure. In one or more embodiments, the method 1300 further includes updating the knowledge graph data structure based on the one or more insights in response to a determination that the degree of correlation corresponds to a correlation threshold value.

In one or more embodiments, the request further comprising a user identifier describing a user role for a user associated with the request, and, in response to the request, the method 1300 further includes correlating the aspects of aggregated operational technology data based on the user identifier to provide the one or more insights.

In one or more embodiments, the method 1300 further includes generating a user-interactive electronic interface that renders a visual representation of the one or more insights. In one or more embodiments, the method 1300 further includes generating one or more notifications associated with the one or more insights. In one or more embodiments, the method 1300 further includes performing one or more actions with respect to the one or more assets based on the one or more insights. In one or more embodiments, the method 1300 further includes predicting one or more conditions for the one or more assets based on the one or more insights. In one or more embodiments, the method 1300 further includes adjusting one or more limit settings for the one or more assets based on the one or more insights. In one or more embodiments, the method 1300 further includes adjusting one or more process thresholds for the one or more assets based on the one or more insights.

Figure 14:
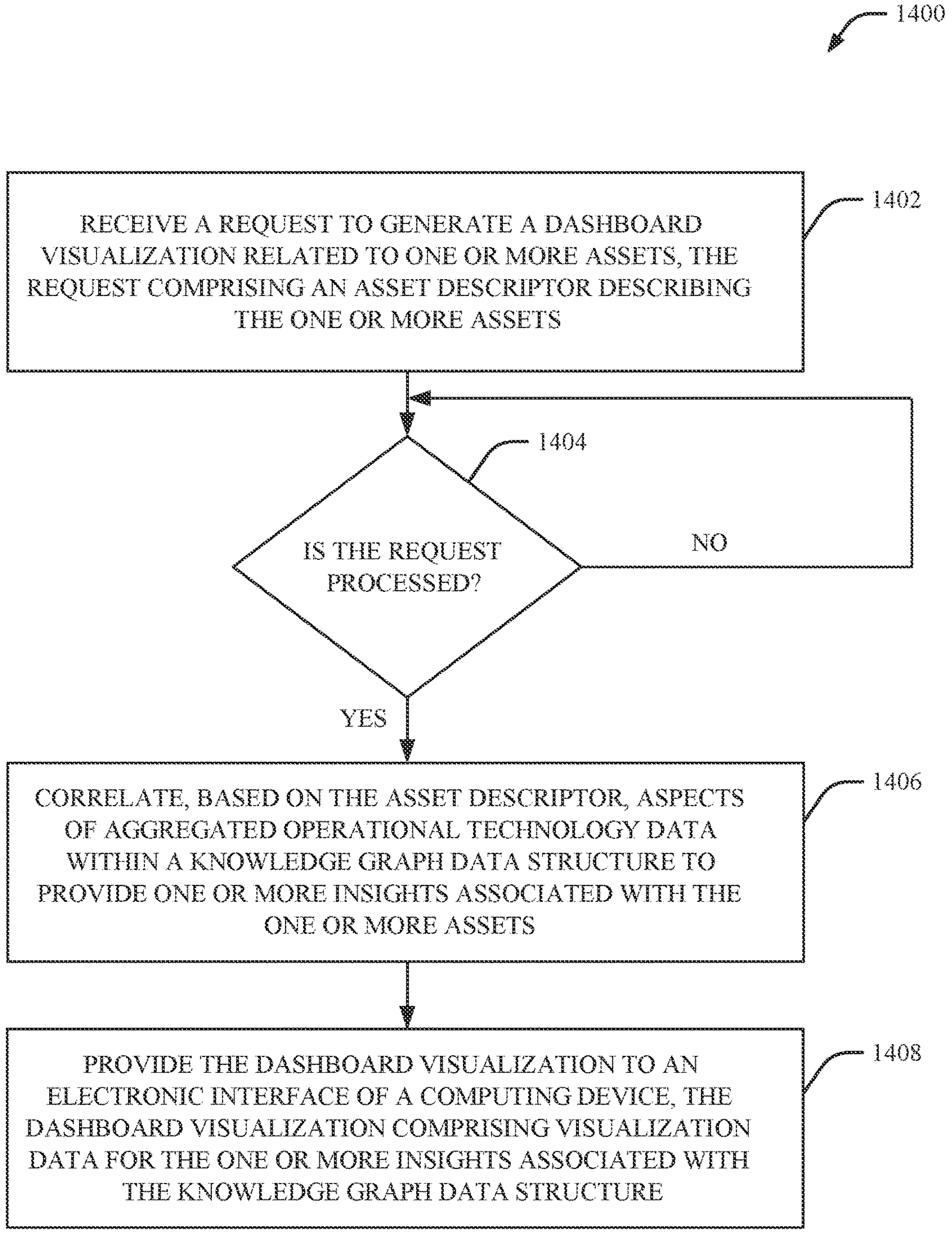
FIG. 14 illustrates a flow diagram for integrity operating window optimization for one or more assets, in accordance with one or more embodiments described herein.

FIG. 14 illustrates a method 1400 for providing an enterprise data management dashboard for one or more assets, in accordance with one or more embodiments described herein. The method 1400 is associated with the enterprise data management computer system 302, for example. For instance, in one or more embodiments, the method 1400 is executed at a device (e.g. the enterprise data management computer system 302) with one or more processors and a memory. In one or more embodiments, the method 1400 begins at block 1402 that receives (e.g., by the knowledge graph component 306 and/or the dashboard visualization component 348) a request to generate a dashboard visualization related to one or more assets, the request comprising an asset descriptor describing the one or more assets. The request provides one or more technical improvements such as, but not limited to, facilitating interaction with a computing device and/or extended functionality for a computing device.

At block 1404, it is determined whether the request is processed. If no, block 1404 is repeated to determine whether the request is processed. If yes, the method 1400 proceeds to block 1406. In response to the request, the method 1400 includes a block 1406 that correlates (e.g., by the knowledge graph component 306) aspects of aggregated operational technology data within a knowledge graph data structure, based on the asset descriptor, to provide one or more insights associated with the one or more assets. In one or more embodiments, attributes, features, different data types, different data nodes, and/or different portions of the aggregated operational technology data within the knowledge graph data structure are correlated to provide the one or more insights associated with the one or more assets. The correlating provides one or more technical improvements such as, but not limited to, extended functionality for a computing device and/or improving performance of one or more assets.

The method 1400 also includes a block 1408 that, in response to the request, provides (e.g., by the dashboard visualization component 348) the dashboard visualization to an electronic interface of a computing device, the dashboard visualization comprising visualization data for the one or more insights associated with the knowledge graph data structure. The providing the dashboard visualization provides one or more technical improvements such as, but not limited to, improving what and/or how to present information via a computing device and/or improving performance of one or more assets.

In one or more embodiments, the method 1400 further includes adjusting one or more operational settings (e.g., one or more operational limits) for the one or more assets based on the dashboard visualization.

In one or more embodiments, the method 1400 further includes determining a predicted operating state for the one or more assets based on the one or more insights. Additionally, in one or more embodiments, the method 1400 further includes configuring the dashboard visualization based on the predicted operating state for the one or more assets. In one or more embodiments, the method 1400 further includes determining the predicted operating state for the one or more assets based on one or more relationships between the attributes of the aggregated operational technology data.

In one or more embodiments, the method 1400 further includes determining, based on the one or more insights, solution data for a predicted event associated with the one or more assets. Additionally, in one or more embodiments, the method 1400 further includes configuring the dashboard visualization based on the solution data. In one or more embodiments, the solution data includes one or more recommended changes for the one or more assets to avoid the predicted event.

In one or more embodiments, the request further comprises a user identifier describing a user role for a user associated with the request. Additionally, in one or more embodiments, the method 1400 further includes configuring the dashboard visualization based on the user identifier. Additionally or alternatively, in one or more embodiments, the method 1400 further includes filtering the visualization data for the dashboard visualization based on the user identifier.

In one or more embodiments, the request further comprises a metrics context identifier describing context for the one or more insights. Additionally, in one or more embodiments, the method 1400 further includes configuring the dashboard visualization based on the metrics context identifier.

In one or more embodiments, the method 1400 further includes determining one or more operational limits for the one or more assets based on the one or more insights. Additionally, in one or more embodiments, the method 1400 further includes displaying one or more graphical elements associated with the one or more operational limits via the dashboard visualization.

In one or more embodiments, the method 1400 further includes determining one or more planning limits for one or more operational plans associated with the one or more assets based on the one or more insights. Additionally, in one or more embodiments, the method 1400 further includes displaying one or more graphical elements associated with the one or more planning limits via the dashboard visualization.

In one or more embodiments, the method 1400 further includes determining one or more quality limits for one or more processes performed by the one or more assets based on the one or more insights. Additionally, in one or more embodiments, the method 1400 further includes displaying one or more graphical elements associated with the one or more quality limits via the dashboard visualization.

In one or more embodiments, the method 1400 further includes determining one or more environment limits for one or more processes performed by the one or more assets based on the one or more insights. Additionally, in one or more embodiments, the method 1400 further includes displaying one or more graphical elements associated with the one or more environment limits via the dashboard visualization.

In one or more embodiments, the method 1400 further includes determining one or more safety limits for one or more processes performed by the one or more assets based on the one or more insights. Additionally, in one or more embodiments, the method 1400 further includes displaying one or more graphical elements associated with the one or more safety limits via the dashboard visualization.

In one or more embodiments, the method 1400 further includes generating one or more operational limit recommendations based on the one or more insights. Additionally, in one or more embodiments, the method 1400 further includes displaying one or more graphical elements associated with the one or more operational limit recommendations via the dashboard visualization.

In one or more embodiments, the method 1400 further includes generating one or more integrity operating window recommendations for the one or more assets based on the one or more insights. Additionally, in one or more embodiments, the method 1400 further includes displaying one or more graphical elements associated with the one or more integrity operating window recommendations via the dashboard visualization.

In one or more embodiments, the method 1400 further includes correlating the attributes of the aggregated operational technology data based on connections between nodes of the knowledge graph data structure.

In one or more embodiments, the method 1400 further includes generating one or more notifications associated with the one or more insights. Additionally, in one or more embodiments, the method 1400 further includes displaying the one or more notifications via the dashboard visualization.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Figure 15:
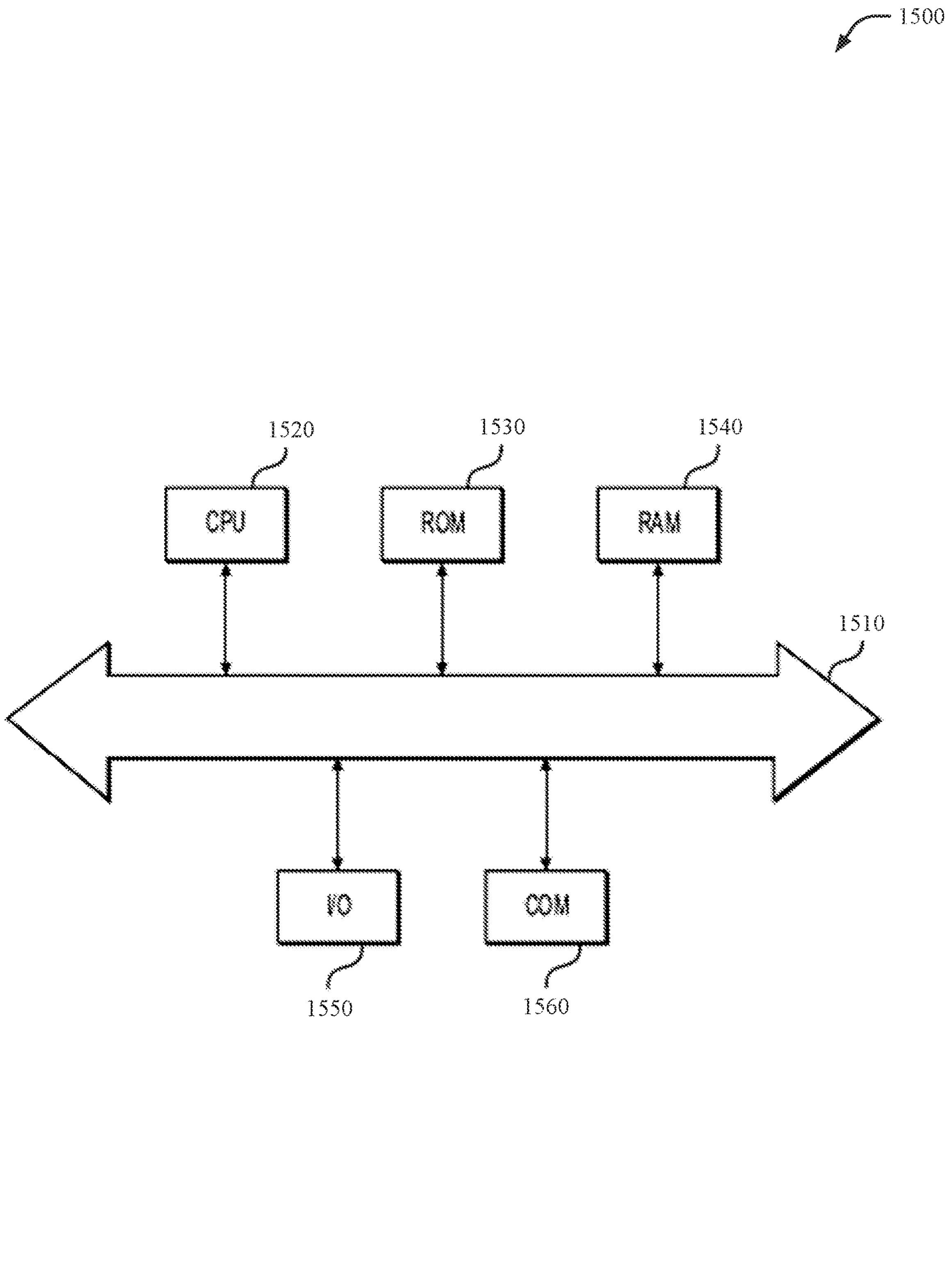
FIG. 15 illustrates a functional block diagram of a computer that may be configured to execute techniques described in accordance with one or more embodiments described herein.

FIG. 15 depicts an example system 1500 that may execute techniques presented herein. FIG. 15 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1560 for packet data communication. The platform also may include a central processing unit ("CPU") 1520, in the form of one or more processors, for executing program instructions. The platform may include an internal communication bus 1510, and the platform also may include a program storage and/or a data storage for various data files to be processed and/or communicated by the platform such as ROM 1530 and RAM 1540, although the system 1500 may receive programming and data via network communications. The system 1500 also may include input and output ports 1550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
- one or more processors;
- a memory; and
- one or more programs stored in the memory, the one or more programs comprising instructions configured to:
  - receive, via the one or more processors, a request to generate knowledge graph data related to one or more assets, the request comprising:
    - an asset descriptor comprising information associated with the one or more assets, wherein the one or more assets correspond to one or more edge devices associated with an industrial plant system; and
  - in response to the request:
    - obtain, based on the asset descriptor, aggregated operational technology data from one or more data sources associated with the one or more assets;
    - contextualize, based on configuration data for the one or more assets and a set of contextualization rules for the one or more data sources, the aggregated operational technology data to generate the knowledge graph data, wherein the configuration data comprises at least one process threshold associated with the one or more assets; and
    - allocate the knowledge graph data within a knowledge graph data structure configured for the one or more assets, wherein the knowledge graph data structure captures ontological relationships among the at least one process threshold, operational states, and process control parameters of the one or more assets; and
  - perform, via the one or more processors, one or more actions with respect to the one or more assets based on the knowledge graph data structure, wherein the one or more actions comprises at least a prediction of one or more limit settings for the one or more assets, and automatically adjust one or more processes associated with the one or more assets in real-time, wherein the one or more actions comprise correlating aspects of the aggregated operational technology data based on relationships represented in the knowledge graph data structure, and adjusting at least the one or more limit settings for the one or more assets based on the correlated aspects and the at least one process threshold, wherein the one or more limit settings for the one or more assets are operating limits associated with process control of the one or more edge devices, and wherein the adjustment of one or more processes associated with the one or more assets comprises modifying process control parameters of the one or more edge devices to maintain operation within predefined integrity operating windows.

2. The system of claim 1, the one or more programs further comprising instructions configured to:
- contextualize the aggregated operational technology data based on a set of contextualization rules for one or more data formats associated with the one or more data sources.

3. The system of claim 2, the one or more programs further comprising instructions configured to:
- parse operation deviation data associated with monitoring of the one or more assets based on the configuration data for the one or more assets and the set of contextualization rules for the one or more data sources.

4. The system of claim 2, the one or more programs further comprising instructions configured to:
- parse alarm history data associated with the one or more assets based on the configuration data for the one or more assets and the set of contextualization rules for the one or more data sources.

5. The system of claim 1, the one or more programs further comprising instructions configured to:
- organize the knowledge graph data based on an ontological data structure that captures relationships among respective knowledge graph data portions within the knowledge graph data structure.

6. The system of claim 1, the request further comprising a user identifier describing a user role for a user associated with the request, and the one or more programs further comprising instructions configured to:

in response to the request, contextualize the aggregated operational technology data based on the user identifier.

7. The system of claim 1, the request further comprising a user identifier describing a user role for a user associated with the request, and the one or more programs further comprising instructions configured to:

in response to the request, select the knowledge graph data structure for the knowledge graph data based on the user identifier.

8. The system of claim 1, the request further comprising a user identifier describing a user role for a user associated with the request, and the one or more programs further comprising instructions configured to:

in response to the request, allocate the knowledge graph data within the knowledge graph data structure based on the user identifier.

9. A method, comprising:

at a device with one or more processors and a memory:

receiving, via the one or more processors, a request to generate knowledge graph data related to one or more assets, the request comprising:

an asset descriptor comprising information associated with the one or more assets, wherein the one or more assets correspond to one or more edge devices associated with an industrial plant system; and in response to the request:

obtaining, based on the asset descriptor, aggregated operational technology data from one or more data sources associated with the one or more assets;

contextualizing, based on configuration data for the one or more assets and a set of contextualization rules for the one or more data sources, the aggregated operational technology data to generate the knowledge graph data, wherein the configuration data comprises at least one process threshold associated with the one or more assets; and allocating the knowledge graph data within a knowledge graph data structure configured for the one or more assets, wherein the knowledge graph data structure captures ontological relationships among the at least one process threshold, operational states, and process control parameters of the one or more assets; and performing, via the one or more processors, one or more actions with respect to the one or more assets based on the knowledge graph data structure, wherein the one or more actions comprises at least a prediction of one or more limit settings for the one or more assets, and automatically adjust one or more processes associated with the one or more assets in real-time, wherein the one or more actions comprise correlating aspects of the aggregated operational technology data based on relationships represented in the knowledge graph data structure, and adjusting at least the one or more limit settings for the one or more assets based on the correlated aspects and the at least one process threshold, wherein the one or more limit settings for the one or more assets are operating limits associated with process control of the one or more edge devices, and wherein the adjustment of one or more processes associated with the one or more assets comprises modifying process control parameters of the one or more edge devices to maintain operation within predefined integrity operating windows.

10. The method of claim 9, further comprising:

contextualizing the aggregated operational technology data based on a set of contextualization rules for one or more data formats associated with the one or more data sources.

11. The method of claim 10, the contextualizing comprising parsing operation deviation data associated with monitoring of the one or more assets based on the configuration data for the one or more assets and the set of contextualization rules for the one or more data sources.

12. The method of claim 10, the contextualizing comprising parsing alarm history data associated with the one or more assets based on the configuration data for the one or more assets and the set of contextualization rules for the one or more data sources.

13. The method of claim 9, the request further comprising a user identifier describing a user role for a user associated with the request, and, in response to the request, contextualizing the aggregated operational technology data based on the user identifier.

14. The method of claim 9, the request further comprising a user identifier describing a user role for a user associated with the request, and, in response to the request, selecting the knowledge graph data structure for the knowledge graph data based on the user identifier.

15. The method of claim 9, the request further comprising a user identifier describing a user role for a user associated with the request, and, in response to the request, allocating the knowledge graph data within the knowledge graph data structure based on the user identifier.

16. The method of claim 9, the allocating the knowledge graph data within the knowledge graph data structure comprising organizing the knowledge graph data based on an ontological data structure that captures relationships among respective knowledge graph data portions within the knowledge graph data structure.

17. A non-transitory computer-readable storage medium comprising one or more programs for execution by one or more processors of a device, the one or more programs including instructions which, when executed by the one or more processors, cause the device to:

receive, via the one or more processors, a request to generate knowledge graph data related to one or more assets, the request comprising:

an asset descriptor comprising information associated with the one or more assets, wherein the one or more assets correspond to one or more edge devices associated with an industrial plant system; and in response to the request:

obtain, based on the asset descriptor, aggregated operational technology data from one or more data sources associated with the one or more assets;

contextualize, based on configuration data for the one or more assets and a set of contextualization rules for the one or more data sources, the aggregated operational technology data to generate the knowledge graph data, wherein the configuration data comprises at least one process threshold associated with the one or more assets; and allocate the knowledge graph data within a knowledge graph data structure configured for the one or more assets, wherein the knowledge graph data structure captures ontological relationships among the at least one process threshold, operational states, and process control parameters of the one or more assets; and perform, via the one or more processors, one or more actions with respect to the one or more assets based on the knowledge graph data structure, wherein the one or more actions comprises at least a prediction of one or more limit settings for the one or more assets, and automatically adjust one or more processes associated with the one or more assets in real-time, wherein the one or more actions comprise correlating aspects of the aggregated operational technology data based on relationships represented in the knowledge graph data structure, and adjusting at least the one or more limit settings for the one or more assets based on the correlated aspects and the at least one process threshold, wherein the one or more limit settings for the one or more assets are operating limits associated with process control of the one or more edge devices, and wherein the adjustment of one or more processes associated with the one or more assets comprises modifying process control parameters of the one or more edge devices to maintain operation within predefined integrity operating windows.

18. The non-transitory computer-readable storage medium of claim 17, the one or more programs further including instructions which, when executed by the one or more processors, cause the device to:

contextualize the aggregated operational technology data based on a set of contextualization rules for one or more data formats associated with the one or more data sources.

19. The non-transitory computer-readable storage medium of claim 18, the one or more programs further including instructions which, when executed by the one or more processors, cause the device to:

parse operation deviation data associated with monitoring of the one or more assets based on the configuration data for the one or more assets and the set of contextualization rules for the one or more data sources.

20. The non-transitory computer-readable storage medium of claim 18, the one or more programs further including instructions which, when executed by the one or more processors, cause the device to:

parse alarm history data associated with the one or more assets based on the configuration data for the one or more assets and the set of contextualization rules for the one or more data sources.

* * * * *